(12) United States Patent
Gowru et al.

(10) Patent No.: US 10,592,866 B2
(45) Date of Patent: Mar. 17, 2020

(54) CALENDAR APPLICATION, SYSTEM AND METHOD FOR CREATING RECORDS IN A CLOUD COMPUTING PLATFORM FROM WITHIN THE CONTEXT OF THE CALENDAR APPLICATION

(71) Applicant: salesforce.com, inc., San Francisco, CA (US)

(72) Inventors: Kapildev Reddy Gowru, San Francisco, CA (US); Eric Alexander Hurlimann Perret, San Francisco, CA (US); Anthony Desportes, San Francisco, CA (US); Tigran Abovyan, North Bergen, NJ (US); Ravi L. Honakere, San Ramon, CA (US); Kayvaan Ghassemieh, San Francisco, CA (US); Vatsal Shah, Hayward, CA (US)

(73) Assignee: salesforce.com, inc., San Francisco, CA (US)

( * ) Notice: Subject to any disclaimer, the term of this patent is extended or adjusted under 35 U.S.C. 154(b) by 72 days.

(21) Appl. No.: 15/593,572

(22) Filed: May 12, 2017

(65) Prior Publication Data

US 2018/0330334 A1 Nov. 15, 2018

(51) Int. Cl.
*G06F 3/048* (2013.01)
*G06Q 10/10* (2012.01)
*G06F 3/0482* (2013.01)

(52) U.S. Cl.
CPC ....... *G06Q 10/1093* (2013.01); *G06F 3/0482* (2013.01)

(58) Field of Classification Search
CPC .. G06Q 10/109; G06Q 10/1093; G06Q 10/10; G06Q 10/06311
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

Gunter, "My Google Apps, Second Edition", published on Jun. 2015 by Que, ISBN: 9780134165134, [Retrieved online] https://www.safaribooksonline.com/library/view/rny-google-apps/9780134165134/) (Year: 2015).*
(Continued)

*Primary Examiner* — Pei Yong Weng
(74) *Attorney, Agent, or Firm* — LKGlobal | Lorenz & Kopf, LLP

(57) ABSTRACT

Methods and systems are provided for creating an instance of an object from within a context of a user interface of a calendar application. The calendar application can automatically detect existing calendars that are associated with a user of a particular organization, and dynamically determine different object types that are associated with calendar items displayed in each of the existing calendars. The different object types can include standard objects and custom objects. The calendar application can then provide a new object creation user interface (UI) element that (when selected) includes a list of the different object types that are displayed in response to selecting the new object creation UI element. When a user selects one of the different object types from the list, the calendar application can create, from within the context of the main user interface of the calendar application, an instance of the object in the cloud computing platform.

15 Claims, 17 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,343,365 B2* | 3/2008 | Farnham .............. G06F 3/0481 707/737 |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,544,058 B2* | 9/2013 | Lim .................... G06F 17/3089 726/1 |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0158855 A1* | 8/2003 | Farnham ............... G06F 3/0481 |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0015387 A1* | 1/2006 | Moore ................... G06Q 10/06 707/600 |
| 2006/0021019 A1 | 1/2006 | Hinton et al. |
| 2006/0069604 A1* | 3/2006 | Leukart ............... G06Q 10/109 715/792 |
| 2006/0212530 A1* | 9/2006 | O'Farrell ................ G06F 8/20 709/212 |
| 2007/0250784 A1* | 10/2007 | Riley .................... G06Q 10/10 715/764 |
| 2007/0260532 A1* | 11/2007 | Blake, III ............. G06Q 40/00 705/35 |
| 2008/0052027 A1* | 2/2008 | Witter ................. G06Q 20/102 702/108 |
| 2008/0155547 A1* | 6/2008 | Weber .................. G06Q 10/109 718/102 |

(56) References Cited

U.S. PATENT DOCUMENTS

| | | |
|---|---|---|
| 2008/0249972 A1 | 10/2008 | Dillon |
| 2008/0270240 A1* | 10/2008 | Chu ................ G06Q 10/06375 705/14.11 |
| 2008/0313006 A1* | 12/2008 | Witter ............ G06Q 10/063118 705/7.17 |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0276771 A1* | 11/2009 | Nickolov .............. G06F 9/4856 717/177 |
| 2010/0082735 A1* | 4/2010 | Petersen ............. H04L 12/6418 709/203 |
| 2010/0088636 A1* | 4/2010 | Yerkes ................ G06F 16/275 715/809 |
| 2010/0162105 A1* | 6/2010 | Beebe ................ G06Q 10/109 715/273 |
| 2011/0211813 A1* | 9/2011 | Marks ................ G06F 17/3089 386/297 |
| 2011/0247051 A1 | 10/2011 | Bulumulla et al. |
| 2012/0030194 A1* | 2/2012 | Jain ....................... G06F 3/0481 707/722 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0054648 A1* | 2/2013 | Mehta ............... G06F 17/30289 707/785 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246223 A1* | 9/2013 | Mesaros ............ G06Q 30/0627 705/26.63 |
| 2013/0247216 A1 | 9/2013 | Cinarkaya et al. |
| 2016/0012111 A1* | 1/2016 | Pattabhiraman .. G06F 17/30554 707/722 |
| 2016/0335303 A1* | 11/2016 | Madhalam .......... G06F 17/3056 |
| 2016/0342955 A1* | 11/2016 | Brock ..................... H04L 67/02 |
| 2016/0364600 A1* | 12/2016 | Shah ..................... G06F 21/629 |
| 2017/0075540 A1* | 3/2017 | Hausler .............. G06Q 10/1093 |
| 2017/0322782 A1* | 11/2017 | Pakiman .................... G06F 8/34 |
| 2018/0059881 A1* | 3/2018 | Agboatwalla ........... F25D 29/00 |
| 2018/0077542 A1* | 3/2018 | Xie .......................... G06Q 50/01 |
| 2018/0129995 A1* | 5/2018 | Fowler ............. G06Q 10/06312 |
| 2018/0181378 A1* | 6/2018 | Bakman ..................... G06F 8/38 |
| 2018/0309801 A1* | 10/2018 | Rathod ............... H04L 65/1069 |

OTHER PUBLICATIONS

Alexander, "Adding Tasks to Google Calendar", published on Jul. 19, 2012, [online] https://www.youtube.com/watch?v=t8n2xsmDB7I (Year: 2012).*

* cited by examiner

CALENDAR APPLICATION, SYSTEM AND METHOD FOR CREATING RECORDS IN A CLOUD COMPUTING PLATFORM FROM WITHIN THE CONTEXT OF THE CALENDAR APPLICATION

TECHNICAL FIELD

Embodiments of the subject matter described herein relate generally to cloud-based computing. More particularly, embodiments of the subject matter relate to a calendar application, system and method for quickly creating records in a cloud computing platform from within the context of the calendar application.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software between multiple sets of users.

A cloud-based computing environment can include a number of different data centers, and each data center can include a number of instances, where each instance can support many tenants (e.g., 10,000 tenants or more). As such, large numbers of tenants can be grouped together into and share an instance as tenants of that instance. Each tenant is its own organization (or org) that is identified by a unique identifier (ID) that represents that tenant's data within an instance.

A calendar application is software that provides users with an electronic version of a calendar that displays dates and times, and a host of other features including appointment calendaring, scheduling and reminders, availability sharing, integrated email, calendar publishing, an address book and/or contact list (e.g., a list of contacts with information to enable users to communicate with the contacts), time management software, etc. Various calendar applications are in use today, including Salesforce® Lightning Calendar, iCal™, Google™ Calendar, and Microsoft™ Office 365, Microsoft™ Outlook with Exchange Server to name a few. These applications present an interface that allows a user to create an event at a specified time. The user may track various events, including meetings that the user has been invited to. Most calendar applications also allow a user to send invite requests for events to other users. When an invitee receives the request, the invitee can choose to accept or decline the request. If the invitee accepts, a corresponding event is typically created in the invitee's calendar.

Many professionals (e.g., sales and marketing professionals, engineers, attorneys, etc.) typically manage their day using a calendar application. Some conventional calendar applications allow a user to specify a very limited set of statically-defined calendar items such as an appointment or meeting that are to appear on their calendar. This allows a user to view certain information about an appointment or meeting that appears on their calendar via a preview panel. For example, the preview panel can allow a user to view certain basic information about the appointment or meeting (i.e., the start and end time, the location, the organizer, and a reminder time).

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
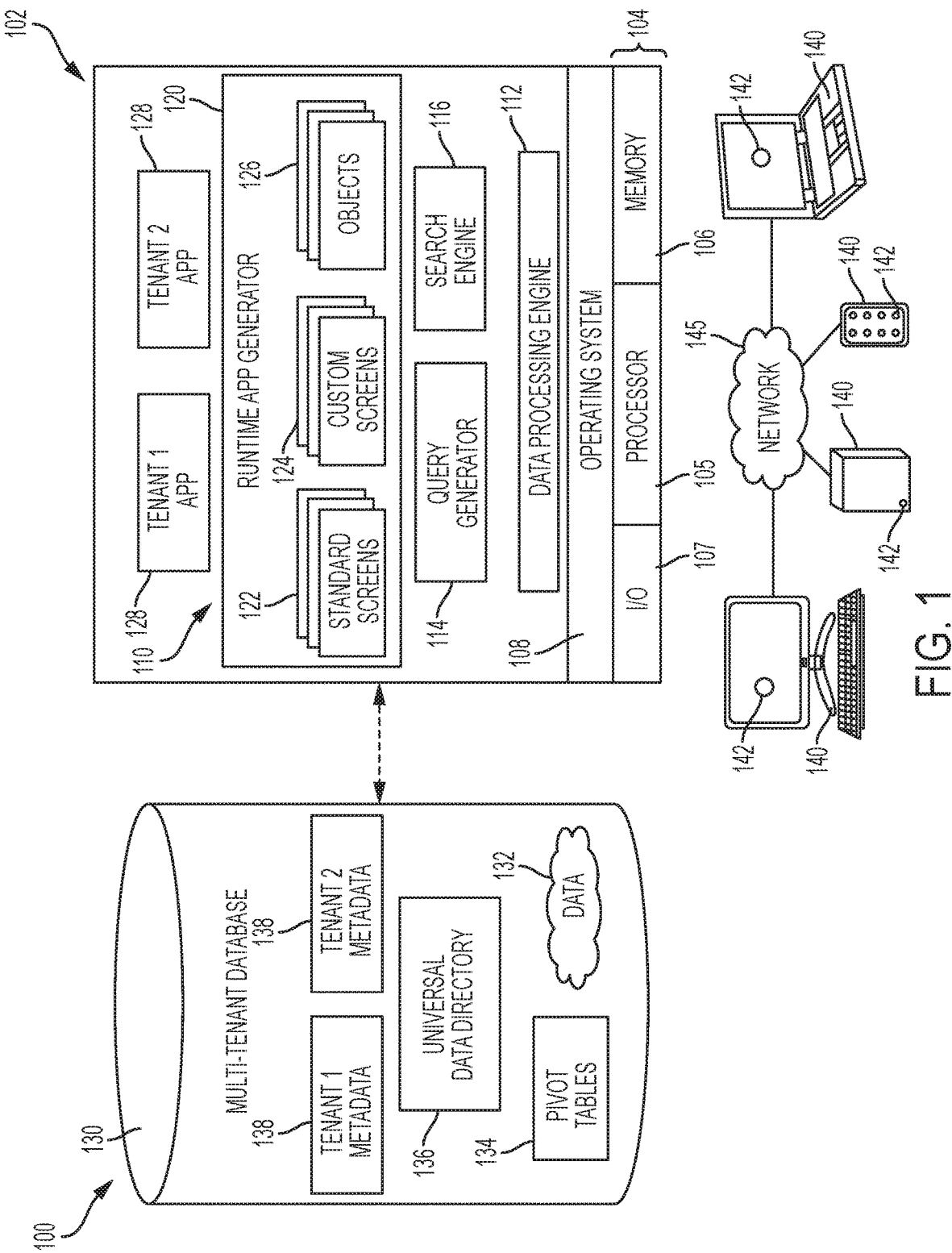
FIG. 1 is a schematic block diagram of an example of a multi-tenant computing environment in which features of the disclosed embodiments can be implemented in accordance with the disclosed embodiments.

One drawback of conventional calendar applications is that only certain specific things (e.g., appointments and meetings) can be displayed on the calendar as calendar items. To address this issue, the Salesforce® Lightning Calendar includes a Calendar Anything feature that allows a user to create multiple calendars in the calendar application based on various Salesforce objects, records or entities (e.g., events, campaigns, tasks, etc.) that are maintained in the Salesforce.com cloud computing platform. Although events can be added to a calendar from within the calendar context, any other items (e.g., any instances of objects or records) that are to be added to the calendar are created from outside the calendar context.

When a user is working within the context of a calendar application, and wants to create new records or perform an action with respect to existing records displayed in the calendar application, the user must leave the calendar context to do so. In other words, the user must navigate away from the page that presents the main user interface (UI) of the calendar application and open another window or home page for that specific entity to create or take action on the record. For instance, a user could be viewing a task item in the main calendar UI that corresponds to a task record, and decide that she wants to enter details or information about the task record, and then mark the task as completed. To do so, the user would need to open another task tab, navigate to the task record, enter the information to update the task record, and then mark the task as completed.

As another example, in some conventional calendar applications a preview panel allows a user to view certain basic information about an appointment or meeting (i.e., the start and end time, the location, the organizer, and a reminder time), but does not allow the user to take any action with respect to the appointment or meeting that is displayed on their calendar directly from the calendar context. Instead, the user must open the appointment or meeting in a new window that overlaps the main UI of the calendar, perform the desired action, and then close the new window before they can return to the main UI of the calendar.

As such, one drawback of these existing calendar applications is that a user does not have the ability to create new records (or instances of objects), or to take actions with respect to existing records (or instances of objects) unless the user leaves the calendar context (e.g., leave the main calendar UI), and opens a new web page or window so that they can either create a new instance of an object or take some action with respect to an existing instance of an object. The process of separately accessing other object or entity home pages (to create a new object or entity to be added to the calendar or perform other actions with respect to an existing instance of an object or entity that is already displayed in the calendar as a calendar item) is time-consuming and inefficient because it forces the user to leave the context of the calendar application and to perform a series of steps that breaks the user's current work flow within the calendar.

It would be desirable to provide calendar applications, methods and systems that can allow users to create new records (or instances of objects) in a cloud computing platform from within the context of the calendar application. As used herein, the term "context of the calendar," also referred to as "calendar context," can refer to a main user interface of the calendar application, or "main calendar UI," where the calendar(s) and calendar items are displayed. For instance, the "calendar context" may refer to a web page that presents the main graphical user interface (GUI) of the calendar application on a display screen of a computer display.

To address some of the issues noted above, a calendar application, system and method are provided for creating records (or instances of objects) (defined in a cloud computing platform) from within the context of UI of the calendar application. The system automatically detects the user's existing calendars that include more than one object type, and dynamically determines different object types that are associated with each of the user's existing calendars. The user can be associated with a particular organization. The system can then populate a new object creation UI element with a list or menu of the different object types that can be created via the new object creation UI element. The different object types can include standard objects and custom objects.

Thereafter, when the user selects the new object creation UI element from within the context of the UI of the calendar application, the user is presented with options for the different types of records (or instances of objects) that can be created. When the user selects one of the options an instance of the object (also known as a "record") can be automatically created, in a cloud computing platform, from within the context of the UI of the calendar application (i.e., without leaving the UI of the calendar application). For instance, in one implementation, the user can simply select an object type from the pull-down menu and click-to-create a new instance of that object (also known as a "record") within a database system of the cloud computing platform. As such, this multi-object creation feature and user interface element can allow a user to create a new instance of an object directly from within the calendar context (i.e., without leaving the main UI of the calendar page).

It would also be desirable to provide calendar applications, methods and systems that can allow users to perform actions on records (or instances of objects) in a cloud computing platform from within the context of the calendar application. To address this need, a calendar application, system and method are provided for performing actions on records (or instances of objects) that are defined in a database system of a cloud computing platform from within the context of the main UI of the calendar application. A user or administrator for an organization can define each "action" by selecting a type of target object from a list of different types of target objects for the organization and an action type from a list of action types, and then creating an association between the target object and the action type to define each action that can be performed with respect to the type of target object. This allows the organization to create rules or "quick actions" that relate to actions for calendar items that include certain types of objects. The target object can be either a standard object or a custom object defined in a cloud computing platform. Likewise, the actions can include standard quick action elements and custom quick action elements that are defined for a particular organization. As such, the types of objects are platform-defined, and the association between object type and action type that defines each action are user-defined (or admin-defined). After the association between the target object and the action type has been created, whenever a calendar item is displayed that relates to an instance of an object (also known as a "record"), and a user interacts with the calendar item (e.g., scrolls on to it or selects it), a preview panel can be displayed for the calendar item within the UI of the calendar application. This preview panel includes a quick action UI element that is associated with the instance of the target object (or "record") and allows for the user to automatically perform the action related to the instance of the target object from within the context of the calendar application. As such, the user can trigger the action on the instance of the target object directly from within context of the calendar application by interacting with the quick action UI element (e.g., interacting with a custom widget, clicking a link or action button, or saving after entering information into fillable-fields presented within the quick action UI element). Thus, the "quick actions" feature of the calendar application can allow a user to act on an instance of an object displayed in the calendar from the calendar context (e.g., perform an action with respect to an instance of an object that is part of a calendar item being displayed in a calendar without leaving the calendar context).

Prior to describing the disclosed embodiments, certain terminology that is used throughout will now be described.

An organization or "org" can refer to a unique identifier (ID) that represents a tenant's data within an instance. Each identifier defines a virtual or logical space provided to an individual tenant (e.g., a deployment of Salesforce® with a defined set of licensed users) where all of that tenant's data and applications are stored within an instance so that it is separate from that of all other organizations that are part of that instance. As such, each organization can be identified by its own unique ID that allows that organization's data to be separated from data of other organizations. The ID serves as an access key and a security barrier for an individual tenant's data in the system. An organization can be thought of as a logical container for one cohesive set of related data, metadata, configurations, settings and schemas that is separate from that of all other organizations. An organization includes all of a tenant's data and applications, and is separate from that of all other organizations. Each organization can be highly customized with respect to other organizations that are part of the same instance. Each organization can have its own custom content that is unique to that particular organization. For a particular organization, custom content can include metadata and associated data that is unique to that particular organization. Each organization can be customized using custom fields, custom objects, workflows, data sharing rules, VISUALFORCE® pages and APEX® coding because even though all tenants with an instance share the same database, the organization ID is stored in every table to ensure that every row of data is linked back to the correct tenant and the data from other tenants sharing the same instance cannot be mixed up.

As used herein, the term "class" can refer to a template or blueprint from which objects are created. An object is an instance of a class. To explain further, all objects have state and behavior, that is, things that an object knows about itself, and things that an object can do. A class can contain variables and methods. Variables are used to specify the state of an object, whereas methods are used to control behavior. A class can contain other classes, exception types, and initialization code.

As used herein, the term "record" can refer to a particular occurrence or instance of a data object that is created by a user or administrator of a database service and stored in a database system, for example, about a particular (actual or potential) business relationship or project. An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, APEX® Code, VISUALFORCE®, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service. A list of standard objects that are currently available from Salesforce is provided at https://developer.salesforce.com/docs/atlas.en-us.object_reference.meta/object_reference/sforce_api_objects_list.htm.

A few non-limiting examples of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

FIG. 1 is a schematic block diagram of an example of a multi-tenant computing environment in which features of the disclosed embodiments can be implemented in accordance with the disclosed embodiments. As shown in FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata stored in the UDD 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain JAVA®, ACTIVEX® or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 embodies the functionality of a collaboration solution such as the CHATTER® system, described below.

Figure 2:
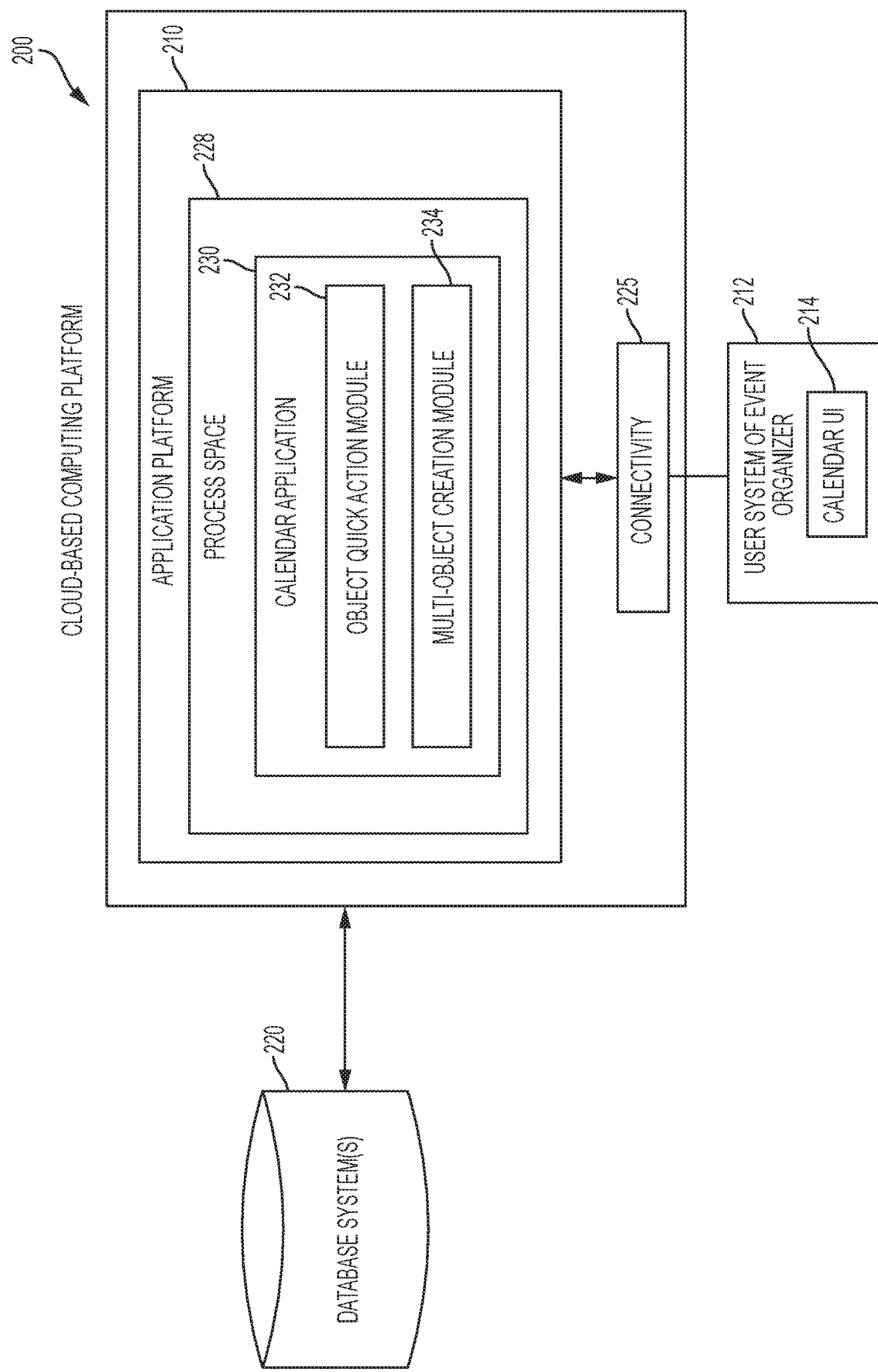
FIG. 2 is a block diagram of a cloud-based computing platform in accordance with the disclosed embodiments.

FIG. 2 is a block diagram of a cloud-based computing platform 200 in accordance with the disclosed embodiments. The cloud-based computing platform 200 is a system that can be shared by many different organizations, and handles the storage of, and access to, different metadata, objects, data and applications across disparate organizations. In one embodiment, the cloud-based computing platform 200 can be part of a database system, such as a multi-tenant database system. The cloud-based computing platform 200 is configured to handle requests for any user associated with any organization that is a tenant of the system. Although not illustrated, the cloud-based computing platform 200 can include other components such as one or more processing systems that execute applications, other process spaces where other applications run, and program code that will be described in greater detail below.

The cloud-based computing platform 200 includes a connectivity engine 225 serves as a network interface that allows a user of a user system 212 to establish a communicative connection to the cloud-based computing platform 200 over a network (not illustrated in FIG. 2) such as the Internet or any type of network described herein.

The cloud-based computing platform 200 includes an application platform 210 and one or more user systems 212 that can access various applications provided by the application platform 210. The application platform 210 is a cloud-based user interface.

The cloud computing platform 200 (including the application platform 210 and database systems 220) are part of one backend system. The application platform 210 also has access to one or more other backend systems 240. Although not illustrated, the could computing platform 200 can include other backend systems that can include one or more servers that work in conjunction with one or more databases and/or data processing components.

The application platform 210 has access to one or more database systems 220 that store information (e.g., data and metadata) for a number of different organizations including user information, organization information, custom information, etc. The database systems 220 can include a multi-tenant database system 130 as described with reference to FIG. 1, as well as other databases or sources of information that are external to the multi-tenant database system 130 of FIG. 1. In one embodiment, the multi-tenant database system 130 can store data in the form of records and customizations.

The computing platform 200 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., APEX® pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects. For example, a "calendar" object can hold calendar records of an organization.

Based on a user's interaction with a user system 212, the application platform 210 accesses an organization's data (e.g., records held by an object) and metadata that is stored at one or more database systems 220, and provides the user system 212 with access to applications based on that data and metadata. These applications can include a calendar application 230 that is executed or run in a process space 228 of the application platform 210 will be described in greater detail below. The user system 212 and various other user systems (no illustrated) can interact with a calendar application 230 provided by the cloud-based computing platform 200.

The calendar application 230 is executable to maintain one or more calendars that can be presented via a graphical interface 214 to a user of one of the user systems 212. The calendar application 230 may allow the user to create and maintain multiple calendars. Each calendar can be defined, for example, as a chart or series of pages showing the days, weeks, and months of a particular year, or giving particular seasonal information. This is also sometimes referred to as the calendar definition. The calendar definition can also hold data which occurs at a point in time relative to the timeframe being included and/or data which occurs over a period of time with a start and an end, relative to the timeframe being included.

The calendar application 230 may allow the user to create calendar items on particular days at particular times. As used herein, a calendar item can refer to a calendar event, or an instance of an object that has a date and/or time field such that it is calendarable and capable of being displayed within the context of the calendar. Examples of calendar items can include calendar events, calendar entries, calendarable records (or instances of objects), records or entities that meet the minimum requirements to be defined on and/or displayed in the calendar, etc. The minimum requirements are at least one date/time datum in a format allowing the item to be positioned on the calendar relative to the time displayed on the calendar. The calendar item may contain more data not specifically required by the minimum requirements for being displayed on a calendar.

One example of a calendar item is a calendar event. For instance, the calendar application 230 can allow a user to invite others to created calendar events as well as receive invitations from others to calendar events. The calendar application 230 may send an invitation to the other user, which can be accepted or declined. The calendar application 230 may also allow a user to set reminders for calendar events that trigger notifications (e.g., a reminder for a notification a certain amount of time before an event is scheduled to begin). The calendar application 230 may maintain a calendar by storing various forms of event information in one or more database systems 220. Event information may include, without limitation, an event name, the start and end times for the event, the invitees of the event, etc. In various embodiments, event information may be accessible to other processes.

Some calendar applications are local and designed for individual use, whereas others are networked applications that allow for the sharing of information between users. In addition, some calendar applications are cloud-based to further extend users ability to share calendar information with other users. In this embodiment, the calendar application 230 is hosted via the cloud-based computing platform 200 to allow users to access their calendars from any computer or mobile device, and to also share information with other users. However, in other embodiments, the calendar application 230 can be a networked calendar application, or hosted locally at the user system 212. The calendar application 230 can vary depending on the implementation, and may be implemented by an existing calendar application, such as iCal™, Mozilla™ Sunbird, Windows™ Live Calendar, Google™ Calendar, Microsoft™ Office 365, Microsoft™ Outlook with Exchange Server, Salesforce.com Calendar, or using various features thereof.

The calendar application 230 can be customized by the user or administrator. Users can use the calendar application 230 to create and maintain various electronic calendars for each user. For example, a given user might have a work calendar, different group calendars within their work calendar, a personal calendar, children's calendar, etc. For example, a group calendar can be used to display calendar events for certain groups that a user is involved in at work. A user can combine and merge different calendars together to gain a better picture of all events on all calendars.

The calendar application 230 can display each calendar showing dates and days of the week with various time slots for each day. The user can view a particular calendar by hourly view, work day view, full day view, work week view, full week view, month view, etc. The calendar application 230 includes an address book or list of contacts with information to enable a user to communicate with the contacts. The calendar application 230 also includes appointment functionality such as an appointment or meeting calendar that includes a list of appointments and the attendees for the appointments. In some implementations, the calendar application 230 can detect scheduling conflicts, notifying the participants of the conflict, and suggesting alternate meeting times. The calendar application 230 can interface with an electronic mail communication system that interfaces with an appointment calendar to send reminders and notify the attendees of invitations to different calendar events (e.g., meetings), send reminders regarding a scheduled calendar event to attendees, or to notify attendees of any issues arising with scheduled calendar events. The calendar application 230 can automatically provide appointment reminders to remind participants of an upcoming meeting, and also includes an attachment feature that allows users to attach files to an appointment so that those files can be shared with other attendees who are participating in the meeting. To facilitate meeting scheduling among several individuals, the calendar application 230 includes features to that allow users to share their availability with other attendees (where users can select how much detail is shared). The calendar application 230 may include scheduling features that automatically check schedules of all attendees and propose a mutually convenient meeting time to all of the attendees. This allows the invitees to suggest times that will work best for them, allowing the event organizer to pick a meeting time that works best for all of the participants. In addition, the calendar application 230 can include scheduling features that allow users to schedule resources to help facilitate the meeting such as room reservation, on-line meeting scheduling that distributes dial in numbers and URLs for on-line meetings, etc. Depending on the implementation, the calendar application 230 can also include other optional features such as calendar publishing that allows a user to publish select calendar information on a public or private link, and calendar exporting that allows a user to export selected calendars into various file formats.

In some embodiments, the calendar application 230 can provide context-sensitive informational overlays that can be displayed in conjunction with a calendar. The calendar application 230 can determine contextual information displayed on or in conjunction with the calendar. This contextual information indicates context for the calendar, and can include calendar data and/or third-party data linked to calendar items that are displayed in the calendar. For example, the context-sensitive informational overlays can be dynamically determined based on calendar data or third-party data linked to calendar items displayed on or in conjunction with a calendar displayed by a calendar application 230. For example, in one embodiment, based on the contextual information, the calendar application 230 can automatically query backend systems to dynamically determine, based on the contextual information, one or more context-sensitive overlays that are pertinent to the calendar in view of the contextual information. The user of user system 212 can then be presented (via the calendar UI 214) with an option to display the overlay(s) with the calendar in conjunction with the calendar. These context-sensitive informational overlays can then be displayed in conjunction with the calendar to provide the user with access to supplemental information related to the calendar that would not normally be viewable by or accessible to the user on the calendar (in absence of the overlay) so that the user can view and otherwise interact with the supplemental information that is part of an overlay that is displayed in conjunction with the calendar. For example, in one embodiment, the context-sensitive overlay(s) can be displayed via the user system as a graphical user interface (GUI) element that is superimposed on the calendar to provide supplemental information that is related to the contextual information and enhances the calendar. The user can interact with (e.g., point-and-click) certain elements of the overlay to view and interact with supplemental information that relates to the calendar. This supplemental information that is displayed as part of the overlay can be pulled in from various database systems 220 and other backend systems.

In accordance with the disclosed embodiments, the calendar application 230 includes an object quick action module 232 that is configurable to allow a user of the user system 212 to perform actions on records defined in the cloud computing platform 200 from within the context of a calendar application 230 (e.g., without leaving the context of the calendar application), and a multi-object creation module 234 that is configurable to allow a user of the user system 212 to that is configurable to allow a user of the user system 212 to create new records in the cloud computing platform 200 from within the context of a calendar application 230. In one implementation, the cloud computing platform 200 is the Salesforce.com platform, and the object quick action module 232 leverages a set of processes available within the Salesforce.com platform to define or set up quick actions within a calendar application for an organization. These quick actions can allow the organization to create rules that relate to actions that can be taken with respect to records for various calendar items on a calendar. The organization can define standard quick action elements and custom quick action elements for the organization that allow users to act on an instance of an object (or record) without leaving the context of the calendar application. In addition, the multi-object creation module 234 leverages a set of processes available within the Salesforce.com platform to create new records for an organization from within the calendar application without leaving the context of the calendar application. Various events or tasks performed by the various elements in FIG. 2 will be described in greater detail below with reference to FIGS. 3A-12. For example, certain operations performed at or by the user system 212, the application platform 210 and the calendar application 230, and the database systems 220 will be described below. In that regard, FIGS. 3A-12 will be described with continued reference to FIG. 2.

Figure 3B:
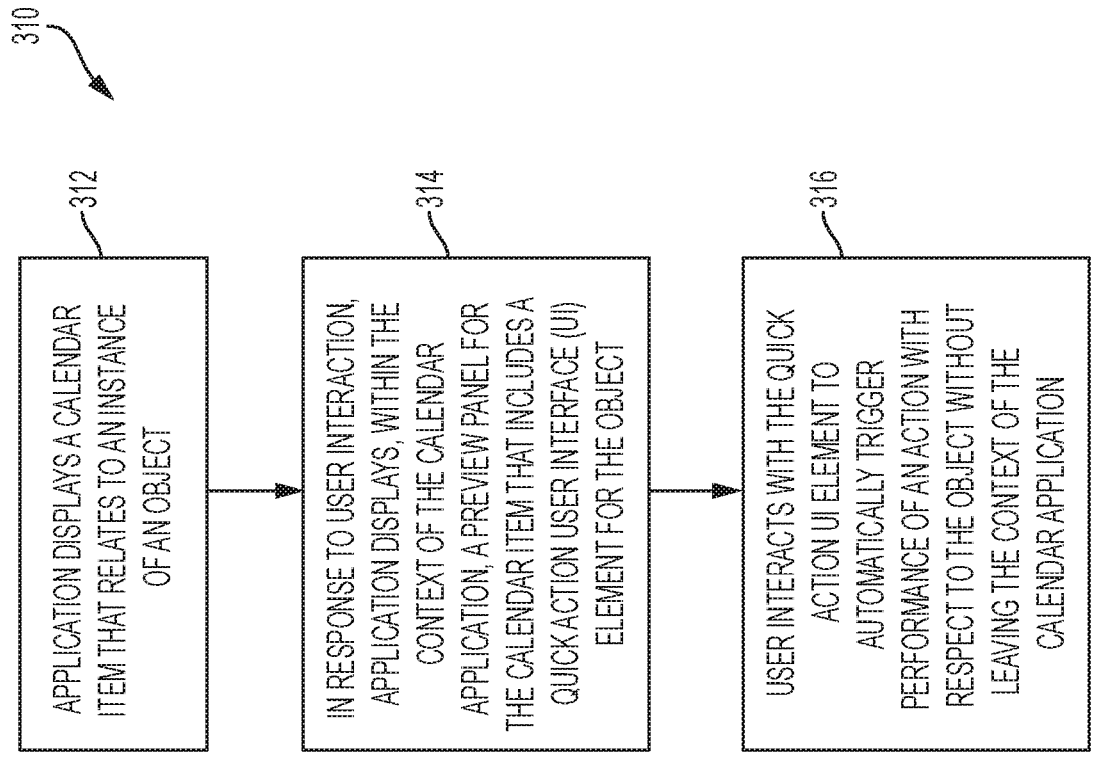
FIG. 3B is a flow chart that illustrates an exemplary method for performing a quick action with respect to an instance of an object that is displayed as a calendar item in a main user interface (UI) of the calendar application in accordance with the disclosed embodiments.
Figure 3A:
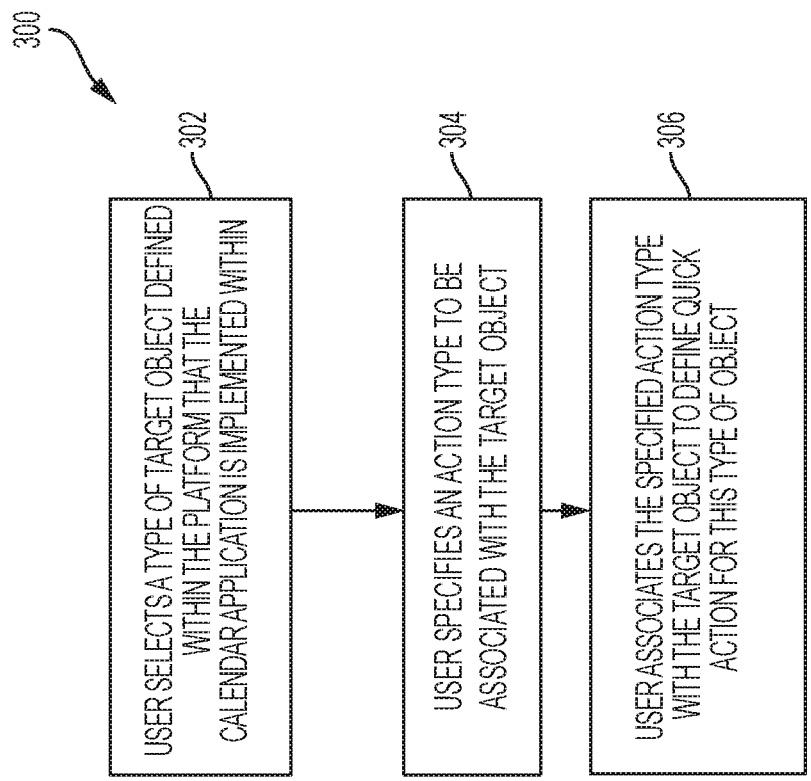
FIG. 3A is a flow chart that illustrates an exemplary method for defining or configuring a quick action that can be performed with respect to a record that is displayed as a calendar item in a calendar application in accordance with the disclosed embodiments.

FIG. 3A is a flow chart that illustrates an exemplary method 300 for defining or configuring a quick action that can be performed with respect to a record that is displayed as a calendar item in a calendar application 230 in accordance with the disclosed embodiments. The method 300 will be described below with continued reference to FIG. 2, and with reference to FIGS. 4 and 5. FIG. 3A describes a method 300 for defining a single "quick action," but it will be appreciated that the method 300 can be repeated to define any number of different quick actions that are associated with different types of objects. It should be understood that steps of the method 300 are not necessarily limiting, and that steps can be added, omitted, and/or performed simultaneously without departing from the scope of the appended claims. It should be appreciated that the method 300 may include any number of additional or alternative tasks, that the tasks shown in FIG. 3A need not be performed in the illustrated order, and that the method 300 may be incorporated into a more comprehensive procedure or process having additional functionality not described in detail herein. Moreover, one or more of the tasks shown in FIG. 3A could potentially be omitted from an embodiment of the method 300 as long as the intended overall functionality remains intact. It should also be understood that the illustrated method 300 can be stopped at any time, for example, by cancelling it. The method 300 is computer-implemented in that various tasks or steps that are performed in connection with the method 300 may be performed by software, hardware, firmware, or any combination thereof. For illustrative purposes, the following description of the method 300 may refer to elements mentioned above in connection with FIG. 2. In certain embodiments, some or all steps of this process, and/or substantially equivalent steps, are performed by execution of processor-readable instructions stored or included on a processor-readable medium. For instance, in the description of FIG. 3A that follows, the cloud-based computing platform 200, the application platform 210, the user system 212, the database system(s) 220, and the calendar application 230 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 3A, a particular example is described in which a user of a user system performs certain actions by interacting with other elements of the system via the user system 212.

The method 300 begins at 302, where a user uses a quick action creation page 400 of the calendar application 230 to select a type of target object that will be associated with a type of action. For example, the user can select a target object from a list of target objects that are displayed in a menu of the quick action creation page. Each target object can have a specific type that is defined by a platform that the calendar application is implemented within.

Figure 4:
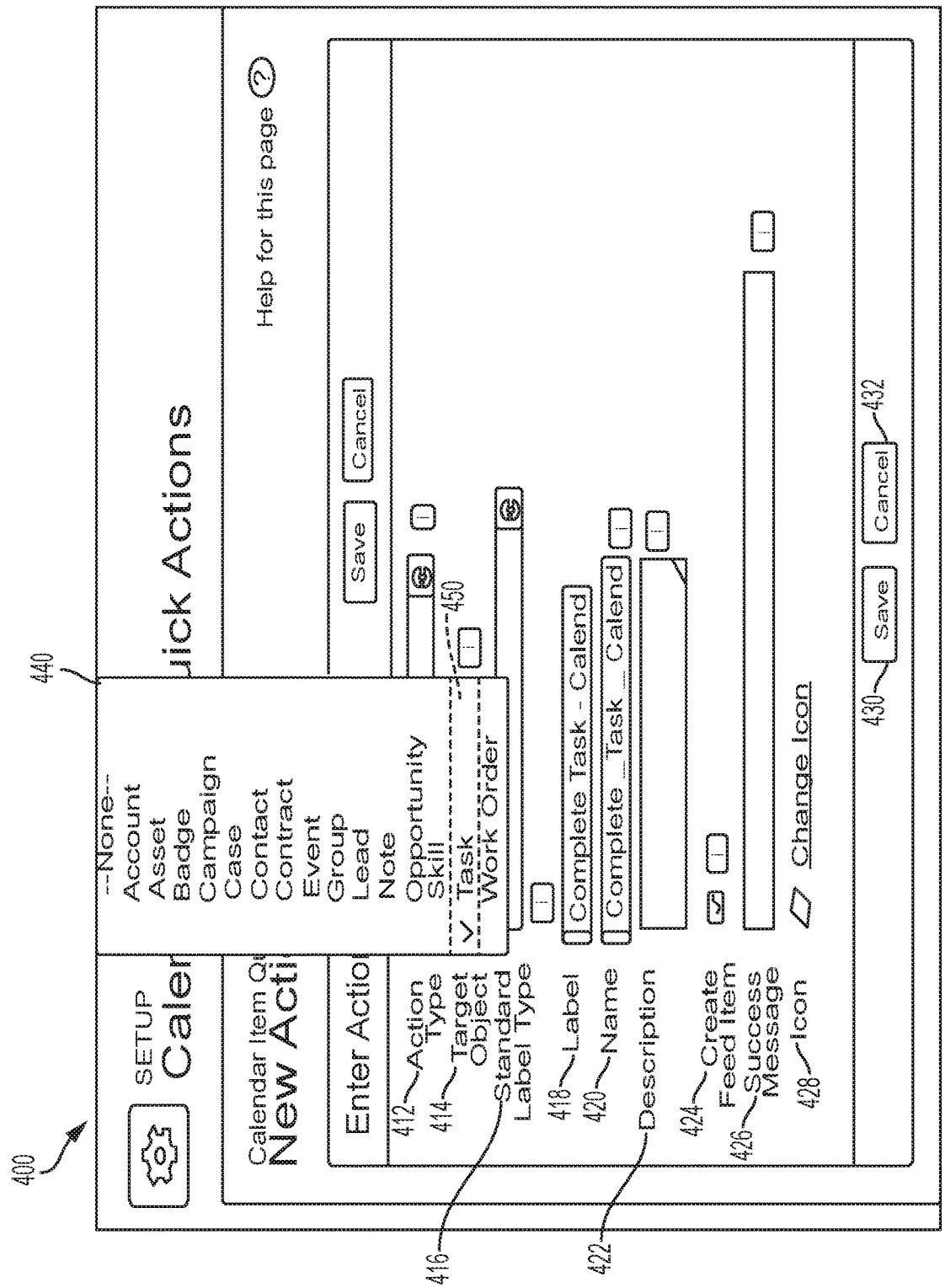
FIG. 4 is a screenshot that illustrates an example of a quick action creation page in accordance with one embodiment.

FIG. 4 is a screenshot that illustrates an example of a quick action creation page 400 in accordance with one embodiment. As illustrated in FIG. 4, the quick action creation page 400 includes a drop-down menu 412 that allows a user to specify an action type to be associated with a particular target object, a pop-up menu 414 that allows the user to specify a target object to be associated with the action type, a drop-down menu 416 that allows a user to specify a standard label type for the quick action, a field 418 that displays the name of the label to be used in the user interface for the quick action (e.g., what the user sees when they use the quick action), a field 420 that specifies the API name used in the database to uniquely identify and store the quick action, a field 422 that allows the user to insert a description of the quick action, a checkbox 424 that when selected by the user allows the quick action to be displayed as a feed item, a field 426 that allows the user to specify a particular success message that is displayed when the quick action has been completed, an icon field 428 that allows the user to specify a particular icon to be used in conjunction with the quick action, a save button 430 that allows the user to save the settings specified in the quick action creation page 400, and a cancel button 432 that allows the user to cancel the setup of the quick action.

As shown in FIG. 4, when the user selects the pop-up menu 414, a list 440 of different target objects is displayed. The different target objects specified in the list can include any number of standard or custom objects that are to be displayed in the drop-down menu. In this example, the pop-up menu 414 includes several standard object types including: account, asset, badge, campaign, case, contact, contract, event, group, lead, note, opportunity, skill, task, and work order. The list 440 of objects shown in this pop-up menu 414 is non-limiting and simply illustrates one example implementation. For purposes of discussion, it will be assumed that the user has selected the task object 450 from the list 440 in the example that follows.

Referring again to FIG. 3A, at 304, the user can then specify an action type that is to be associated with the target object by selecting the action type from a list of action types displayed in another menu of the quick action creation page. The action types that can be associated with each target object can differ. In other words, each target object has a set of actions types that can be associated with that target object. The "set of action types" varies depending on the specific target object that is selected.

Figure 5:
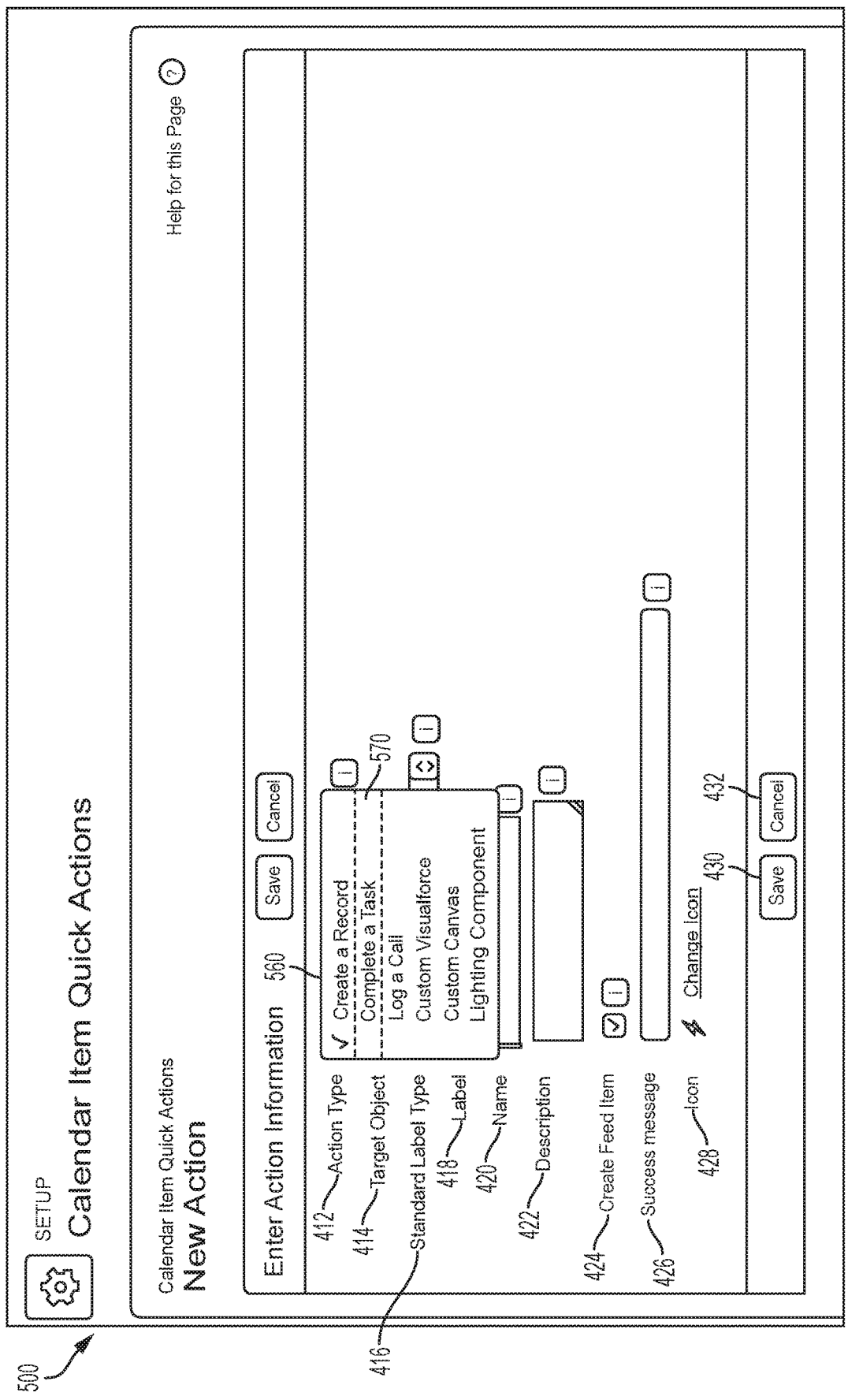
FIG. 5 is a screenshot that illustrates an example of action types that can be selected via a quick action creation page in accordance with one embodiment.

FIG. 5 is a screenshot that illustrates an example of action types that can be selected via a quick action creation page 400 in accordance with one embodiment. As illustrated in FIG. As shown in FIG. 5, when the user selects the drop-down menu 412, a list 560 of different types of quick actions (also referred to herein as "action types") that can be taken with respect to the target object is displayed. The different types of quick actions specified in the list 560 can include any number of different types of quick actions. The different types of quick actions can include standard action types and/or custom action types. The standard action types can be pre-defined within a platform, for example, via a process builder tool or application that is linked to a database of standard objects. For example, an administrator of the organization can define a workflow or a rule set for defining a workflow using a rule builder application. One example of such a rule builder is the Process Builder provided by salesforce.com of San Francisco, Calif. The custom action types can be defined by an organization via a programming language or APEX® class. As used herein, the term "APEX®" refers to a strongly typed, object-oriented programming language that allows developers to execute flow and transaction control statements on a FORCE.COM® platform server in conjunction with calls to the FORCE.COM® API. FORCE.COM® applications are built using APEX® and VISUALFORCE®. Using syntax that looks like JAVA® and acts like database stored procedures, APEX® enables developers to add business logic to most system events, including button clicks, related record updates, and VISUALFORCE® pages. APEX® code can be initiated by Web service requests and from triggers on objects. APEX® can be used to add business logic to applications, to write database triggers, and to program controllers in a user interface layer. APEX® has a tight integration with the database and query language, good web services support, and includes features such as futures and governors for execution in a multi-tenant environment. Additional details regarding APEX® will be briefly summarized below, but additional information can be found in the Apex Developer Guide, Version 36.0, Spring '16, Last Updated: Mar. 3, 2016, which is incorporated by reference herein in its entirety.

In this example, the drop-down menu 412 includes several different types of quick actions (labeled as action type in FIG. 5) that can be taken with respect to a task object 450 that was selected in FIG. 4 including: create a record, complete a task, log a call, custom VISUALFORCE®, custom canvas, and lightning component. The create a record action type allows the user to create a record related to the instance of the task object. The complete a task action type allows the user to mark the instance of the task object as being completed. The log a call action type allows the user to log a call related to the instance of the task object. A VISUALFORCE® page, lightning component, or a canvas application can be used to create global custom actions for tasks that don't require users to use records that have a relationship to a specific object. The list 560 of action types shown in this drop-down menu 412 is non-limiting and simply illustrates one example implementation. In this example, it will be assumed that the user has selected the "complete a task" action type 570 from the list 560 to associate with any instances of task objects 450 that are displayed as calendar items in the main calendar UI 214.

Referring again to FIG. 3A, at 306, the user can then associate the selected action type (that was specified at 304) with the selected target object (that was selected at 302), for example, by hitting the save button 430, to define the quick action that is associated with and related to that type of target object. In other words, an action type can be explicitly tied to or associated with an instance of that type of object by a user or admin so that it can be performed in conjunction with respect to any instance of that target object when invoked (e.g., by interacting with a quick action UI element such as an action button, link or other widget as will be described below). After the quick actions have been defined for the calendar application, the user of the calendar application can use these quick actions as will now be described with reference to FIGS. 3B and 6 and 7.

FIG. 3B is a flow chart that illustrates an exemplary method 310 for performing a quick action with respect to an instance of an object that is displayed as a calendar item in a main user interface (UI) 214 of the calendar application 230 in accordance with the disclosed embodiments. The method 310 will be described below with continued reference to FIG. 2, and with reference to FIGS. 6 and 7. It should be understood that steps of the method 310 are not necessarily limiting, and that steps can be added, omitted, and/or performed simultaneously without departing from the scope of the appended claims. It should be appreciated that the method 310 may include any number of additional or alternative tasks, that the tasks shown in FIG. 3B need not be performed in the illustrated order, and that the method 310 may be incorporated into a more comprehensive procedure or process having additional functionality not described in detail herein. Moreover, one or more of the tasks shown in FIG. 3B could potentially be omitted from an embodiment of the method 310 as long as the intended overall functionality remains intact. It should also be understood that the illustrated method 310 can be stopped at any time, for example, by cancelling it. The method 310 is computer-implemented in that various tasks or steps that are performed in connection with the method 310 may be performed by software, hardware, firmware, or any combination thereof. For illustrative purposes, the following description of the method 310 may refer to elements mentioned above in connection with FIG. 2. In certain embodiments, some or all steps of this process, and/or substantially equivalent steps, are performed by execution of processor-readable instructions stored or included on a processor-readable medium. For instance, in the description of FIG. 3B that follows, the cloud-based computing platform 200, the application platform 210, the user system 212, the database system(s) 220, and the calendar application 230 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 3B, a particular example is described in which a user of a user system performs certain actions by interacting with other elements of the system via the user system 212.

The method 300 begins at 312, when a user opens the calendar application 230, and the main UI (UI) 214 of calendar application 230 is displayed with one or more calendar items. Each calendar item that relates to an instance of an object that represents data associated with the calendar item. As used herein, a calendar item can refer to a calendar event, or an instance of an object that has a date and/or time associated with it such that it is calendarable or capable of being displayed within the context of the calendar. Some non-limiting examples of different types of calendarable standard object types, for example, can include events, opportunities, tasks, contacts, cases, accounts, leads, etc.

Figure 6:
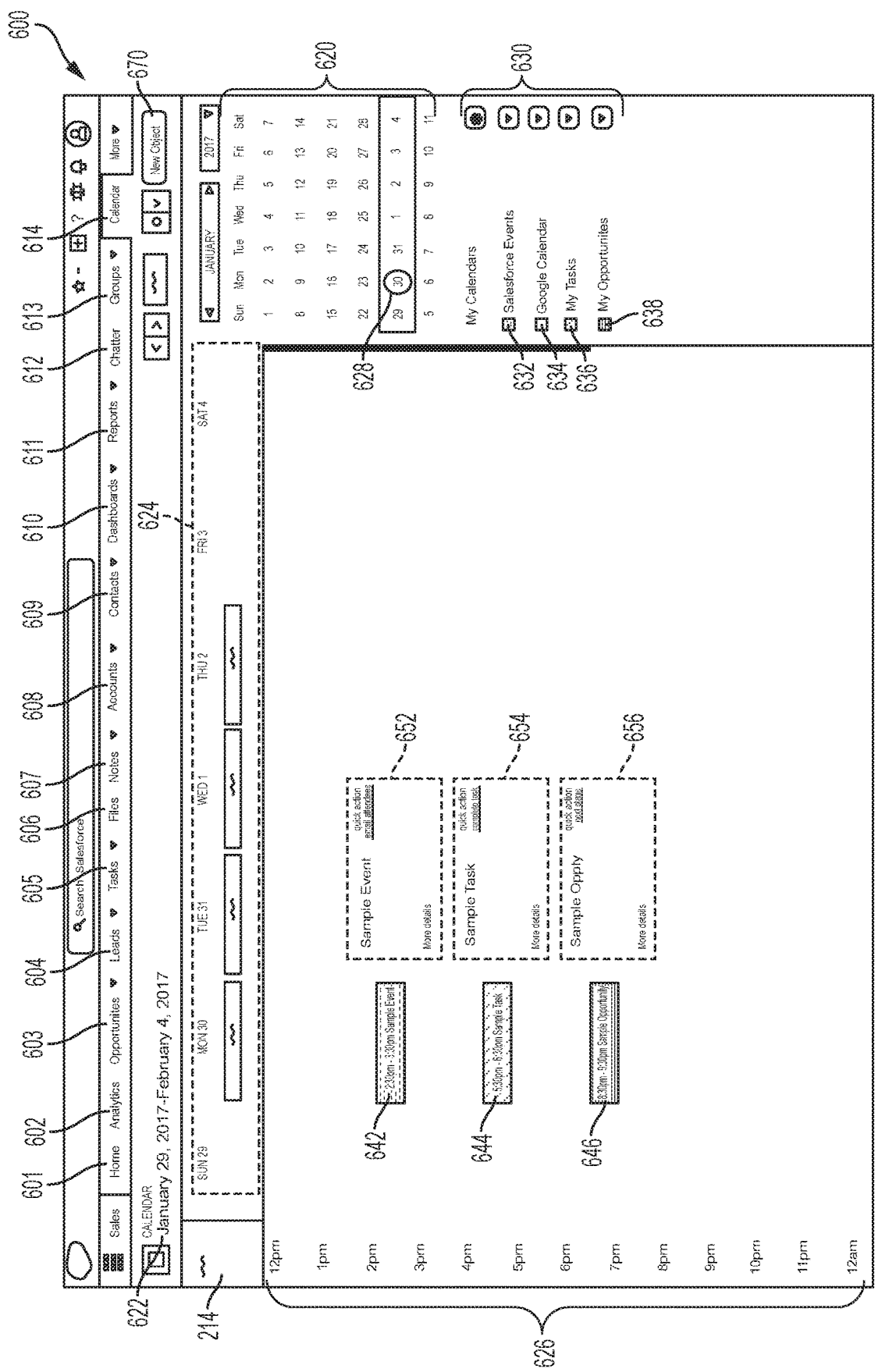
FIG. 6 is a screenshot that illustrates a user interface for an organization that includes a navigation bar with various tabs in accordance of the disclosed embodiments.

FIG. 6 is a screenshot 600 that illustrates a user interface 600 for an organization that includes a navigation bar with various tabs 601 . . . 614 in accordance of the disclosed embodiments. In this example, the navigation bar includes a variety of tabs 601 . . . 614 that can be selected by the user to open different webpages to display various user interfaces that the user can interact with. The user or an administrator can configure the particular tab options that are displayed within the navigation bar for a particular user. In this non-limiting example, the user or administrator has configured the navigation bar to display various tabs 601 . . . 614 including: a home tab 601, an analytics tab 602, an opportunities tab 603, a leads tab 604, a tasks tab 605, a files tab 606, a notes tab 607, an accounts tab 608, a contacts tab 609, a dashboards tab 610, a reports tab 611, a chatter tab 612, a groups tab 613, and a calendar tab 614. Some of the tabs that are included, such as, the home tab 601, the analytics tab 602, the Chatter tab 612, and the calendar tab 614 are standard tabs that all users of the organization use. Other tabs are used display pages that include user interfaces for applications and/or creation and management of instances of standard objects in the cloud computing platform (e.g., the Salesforce.com platform) including: the opportunities tab 603, the leads tab 604, the tasks tab 605, the files tab 606, the notes tab 607, the accounts tab 608, the contacts tab 609, the dashboards tab 610, the reports tab 611, and the groups tab 613.

In this example, the user has selected the calendar tab 614 which causes the main UI 214 of the calendar app 230 to be displayed. As described above, the user can select various options for the calendars that are to be displayed in the main UI 214 and how they are to be displayed within the main UI 214. For instance, the user can select or specify which calendars are to be displayed in the main UI 214, and which date and time ranges are to be displayed within the main UI 214.

In this example, the available calendars for this user displayed in a region 630 of the main UI 214. For this particular user the different calendar options include: an organization events calendar 632 (where the Organization here is Salesforce.com), a Google calendar 634, a task calendar 636 and an opportunities calendar 638. Each of these calendars has a different color associated with it so that the user can easily identify which calendar a particular calendar item displayed on the main UI 214 belongs to, as will be described further below.

The user can also specify date and time ranges that are to be displayed within the main UI 214. In this non-limiting example, the user has selected a week view to be displayed in the main UI 214, in particular, the week of Jan. 29, 2017 through Feb. 4, 2017 as shown in 622, 624. The user can also specify a time range 626 that is to be displayed in the main UI 214, and in this example, the user has specified the time range from 12 PM to 12 AM. Accordingly, any calendar items that occur between 12 PM and 12 AM for those calendars 632, 634, 636, 638 during the week of Jan. 29, 2017 through Feb. 4, 2017 will be displayed on the main UI 214.

Region 620 of the main UI 214 is used to display a monthly view of the calendar so that the user can readily ascertain which days of the week a particular date within that month falls upon. In addition, the user can select a particular day of the calendar to view, by selecting it from the monthly calendar that is displayed in region 620. In this example, the user has selected Monday, January 30 (as indicated by reference number 628) from the monthly view, and therefore, calendar items that fall on that day are the only ones that are displayed in the main UI 214. As shown in FIG. 6, three different calendar items 642, 644, 646 are displayed at different times on Monday, May 30. These calendar items include a calendar item 642 for an event that is scheduled to take place from 2:30 PM to 3:30 PM, another calendar item 644 for a task that has a time from 5:30 PM to 6:30 PM associated with it, and another calendar item 646 for an opportunity that has a time from 8:30 PM to 9:30 PM associated with it.

Referring again to FIG. 3B, at 314, when a user interacts with the calendar item (e.g., scrolls over it or selects it), a preview panel for the calendar item can be displayed within the main UI 214 of the calendar application. FIG. 6 illustrates three different examples of preview panels 652, 654, 656 that can be displayed for the calendar items 642, 644, 646 within the main UI 214 of the calendar application 230 when a user interacts with the calendar items 642, 644, 646. Although FIG. 6 shows three preview panels 652, 654, 656, it is noted that only one of the preview panels is displayed at any particular time for the particular calendar items that the user is currently interacting with. For example, when the user is currently interacting with the calendar item 646, only the corresponding preview panel 656 for that calendar item 646 would be displayed within the main UI 214 of the calendar application 230, and the other preview panels 652, 654 would not be displayed for the user until the user interacts with one of their corresponding calendar items 642, 644, respectively.

At 316, the user can interact with a quick action UI element to trigger an action on the instance of the target object or "record" while staying within context of the calendar application (e.g., without leaving the context of the calendar application). As such, the user can cause the quick action to be performed with respect to the instance of the target object while staying within the context of the calendar application.

Figure 7:
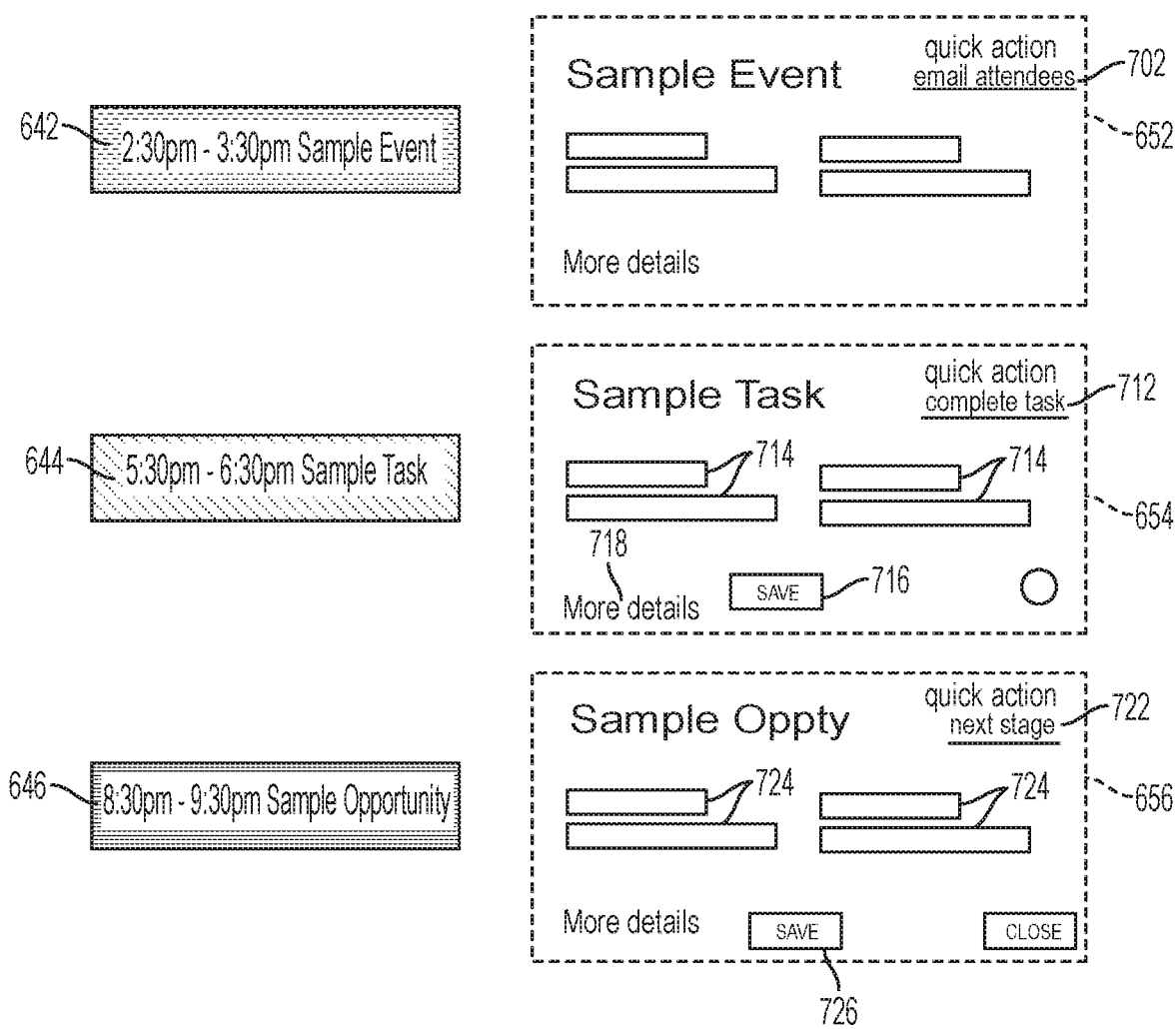
FIG. 7 is a screenshot that illustrates the calendar items of FIG. 6 and corresponding preview panels in greater detail.

FIG. 7 is a screenshot that illustrates the calendar items 642, 644, 646 of FIG. 6 and corresponding preview panels 652, 654, 656 in greater detail. As illustrated in FIG. 7, when a user interacts with (e.g., selects or scrolls over) the calendar item 644 for an instance of a task object (or "task record"), a corresponding preview panel 654 for that calendar item 644 would be displayed within the main UI 214 of the calendar application 230. Likewise, when a user interacts with the calendar item 642 for an instance of an event object (or "event record"), a corresponding preview panel 652 for that calendar item 642 would be displayed within the main UI 214 of the calendar application 230, and when a user interacts with the calendar item 646 for an instance of an opportunity object (or "opportunity record"), a corresponding preview panel 656 for that calendar item 646 would be displayed within the main UI 214 of the calendar application 230.

Each preview panel includes a quick action UI element that has been associated with an instance of an object that represents data associated with the calendar item. As such, each quick action UI element is associated with and relates to (or it tied to) the instance of the target object. Each quick action UI element allows for the user to perform a "quick" action related to the instance of the target object without leaving the calendar context (e.g., the context of the main UI 214 of the calendar application 230). As such, each quick action UI element can allow a user to perform an action related to the instance of the target object while the user remains on and continues interacting with the main calendar web page without leaving the calendar web page.

Depending on the implementation, the quick action UI element can include a variety of interactive elements such as hyperlinks, action buttons, user fillable fields, custom widgets, etc. that allow the user to automatically perform an action related to the instance of the target object within the context of the calendar application. For example, the user can click on the link or the action button displayed within the quick action UI element to trigger an action without leaving the context of the calendar application. Alternatively, the user can enter or change information in certain fields displayed within the quick action UI element to change data associated with the instance of the target object without leaving the context of the calendar application. The quick actions are platform defined actions in that they can be defined and performed at a platform level. The quick actions can be set on any object (e.g., CRM entity) and then surfaced in the calendar context.

In general terms, an action can be one or many rules that are acted upon when a record meets some criteria. This resulting action can be comprised of rules that apply to the original record or other related records. The rule(s) can be applied to an instance of an object to cause something to happen that relates to (or with respect to) that instance of the object. This "something" that happens could be, for example, a change, modification or update to data that is associated with the instance of the object, a change to the status of the instance of the object (e.g., deletion of the instance of the object), automatically triggering or causing an event, communication, or execution of software logic, etc. One non-limiting example of an action that can be performed on an instance of an object can be the creation of another instance of an object within a database system. This other instance of the object can be: another instance of the same object that the action was taken on, another instance of an object that is related to the instance of the target object that the action was taken on, another instance of an entirely different object than the target object that the action was taken on, or another instance of an entirely different object that is unrelated to the instance of the target object that the action was taken on. This is one non-limiting example of an action, and it should be appreciated that actions include things other than creation of objects.

In the non-limiting example shown in FIG. 7, the preview panel 652 for calendar item 642 includes a quick action UI element that includes at least a hyperlink 702. The quick action UI element has been associated with an instance of an event object that represents data associated with the calendar item 642. The hyperlink 702 allows the user to "email attendees" who are specified in the instance of the event object without leaving the context of the main user interface 214 of the calendar application 230. In this example, the event object has been associated with an email attendees action type so that when the user selects a calendar item that include an instance of an event object, the user will be presented with an option to automatically generate an email with all of the attendees automatically cc'ed. This allows the user to email the attendees while the user remains on and continues interacting with the calendar web page without leaving the calendar web page. In this example, the quick action UI element could simply consist of the hyperlink 702, but it should be appreciated that the quick action UI element can include other interactive elements (in addition to or as an alternative to) the hyperlink 702 that allows the user to take other action with respect to the event object that is associated with calendar item 642. As noted above, as non-limiting example, the quick action UI element could also include other interactive elements such as action buttons, user fillable fields, custom widgets, etc. that allow the user to automatically perform other actions related to the instance of the event object while remaining within the context of the calendar application.

For example, the preview panel 654 for calendar item 644 includes a quick action UI element that includes a hyperlink 712, and a plurality of fillable fields 714 and associated save button 716. The quick action UI element has been associated with an instance of a task object that represents data associated with the calendar item 644. The hyperlink 712 allows the user to complete a task that is specified by the instance of the task object without leaving the context of the main UI 214 of the calendar application 230. This allows the user to complete the task directly from the calendar UI 214 while the user remains on and continues interacting with the calendar web page (e.g., without leaving the calendar web page to open another web page to mark that task as completed). In addition to the hyperlink 712, the quick action UI element also includes the plurality of user fillable fields 714 that allow the user to make a quick inline edit to change (e.g., update, edit, delete or add) information/data related to the instance of the task object that is associated with calendar item 644, and a save button 716 that the user can select to automatically save, and thus change, the information related to the instance of the task object while remaining within the context of the calendar application. In addition, the preview panel 654 for calendar item 644 also includes a link 718 that (when selected) allows the user to view more details related to the instance of the task object.

The preview panel 656 for calendar item 646 includes a quick action UI element that includes a hyperlink 722, a plurality of fillable fields 724 and associated save button 726, and a close button 728. The quick action UI element has been associated with an instance of an opportunity object that represents data associated with the calendar item 646. The hyperlink 722 allows the user to advance the opportunity to the "next stage" that is specified in the instance of the opportunity object without leaving the context of the main UI 214 of the calendar application 230. This allows the user to move the status of the opportunity to the next stage while the user remains on and continues interacting with the calendar web page without leaving the calendar web page. In addition to the hyperlink 722, the quick action UI element also includes the plurality of user fillable fields 724 that allow the user to make a quick inline edit to change (e.g., update, edit, delete or add) information related to the instance of the opportunity object that is associated with calendar item 646, and a save button 726 that the user can select to automatically save, and thus change, the information/data related to the instance of the opportunity object while remaining within the context of the calendar application. The quick action UI element also includes a close button that allows the user to close out the opportunity while the user remains on and continues interacting with the calendar web page without leaving the calendar web page. All of these different actions (i.e., advancing the opportunity to the next stage, closing the opportunity out, or updating information associated with the opportunity) would normally require the user to leave the calendar context and open a new web page or window and take the different actions, but in accordance with the disclosed embodiments, the user can user the quick action UI element to perform these actions from the main UI of the calendar application. In addition, the preview panel 656 for calendar item 646 also includes a link 730 that (when selected) allows the user to view more details related to the instance of the opportunity object. This can be helpful when the user needs more information about the instance of the opportunity object to make a decision about how the quick action UI element should be used. It should be appreciated that the examples in FIG. 7 are non-limiting and that any number of other action buttons, links, custom widgets or fillable fields can be included as part of the quick action UI elements that are displayed in the various preview panels to allow the user to perform different actions with respect to an instance of an object.

Referring again to FIG. 6, the UI 214 of the calendar application 230 also includes a new object creation UI element 670. As will now be described in greater detail below with reference to FIGS. 8-12, the new object creation UI element 670 is used to control a multi-object creation feature of the calendar application 230. The new object creation UI element 670 allows a user to select and create new instances of different objects (in a cloud computing platform) directly from within the context of the UI 214 of the calendar application 230 (e.g., without leaving the UI 214 of the calendar application 230) so that the user does not have to leave the calendar to create new instances of objects.

Figure 8:
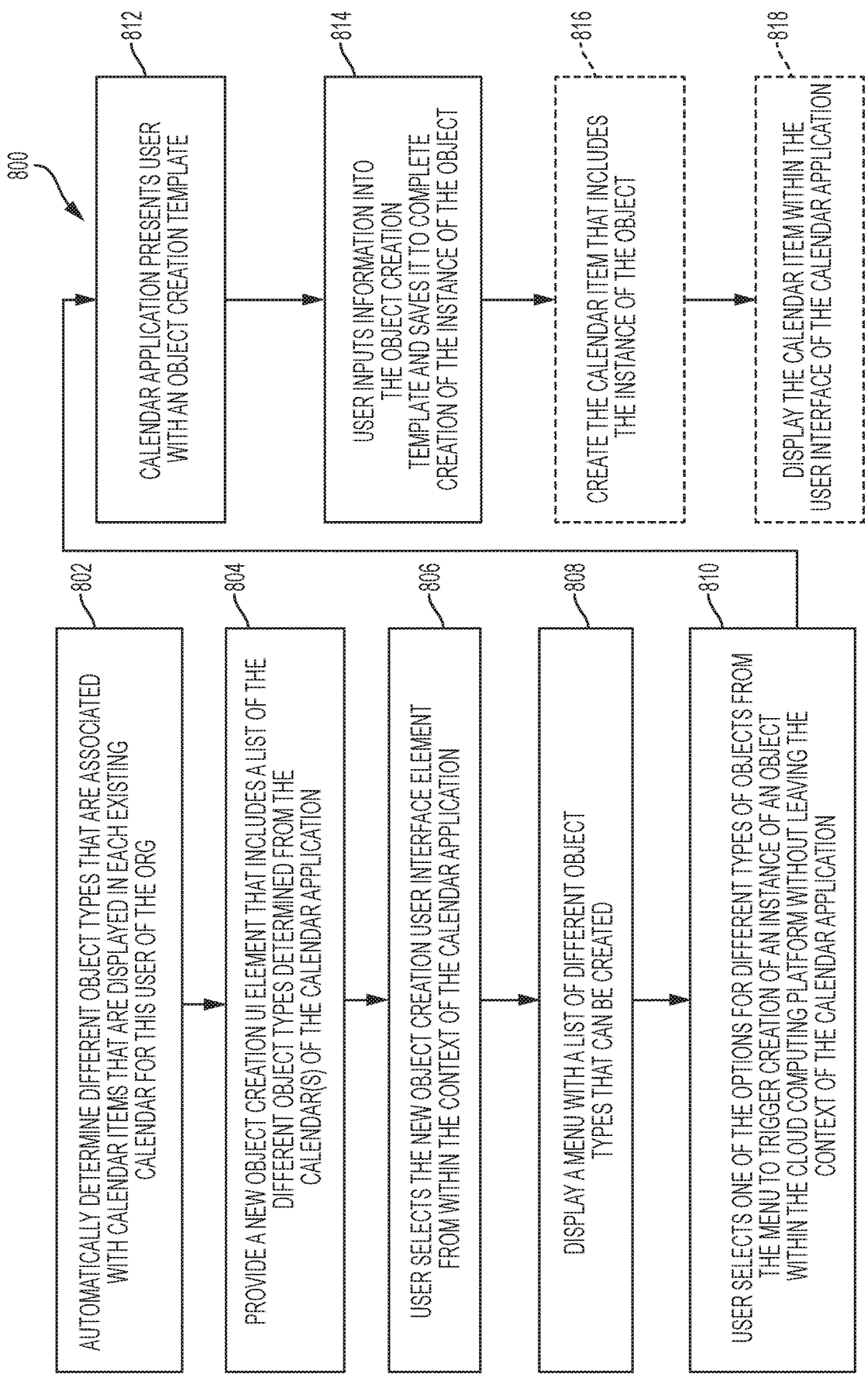
FIG. 8 is a flow chart that illustrates an exemplary method for creating an instance of an object in a cloud computing platform, from within a context of a user interface of a calendar application, and displaying the instance of the object as a calendar item in UI of the calendar application in accordance with the disclosed embodiments.

FIG. 8 is a flow chart that illustrates an exemplary method 800 for creating an instance of an object in a cloud computing platform, from within a context of a user interface of a calendar application, and displaying the instance of the object as a calendar item in UI 214 of the calendar application 230 in accordance with the disclosed embodiments. The method 800 will be described below with continued reference to FIG. 2, and with reference to FIGS. 9 through 12. Although FIG. 8 describes a method 800 for creating and displaying a single instance of a particular type of object, it will be appreciated that the method 800 can be repeated to create any number of different instances of different types of objects. It should be understood that steps of the method 800 are not necessarily limiting, and that steps can be added, omitted, and/or performed simultaneously without departing from the scope of the appended claims. It should be appreciated that the method 800 may include any number of additional or alternative tasks, that the tasks shown in FIG. 8 need not be performed in the illustrated order, and that the method 800 may be incorporated into a more comprehensive procedure or process having additional functionality not described in detail herein. Moreover, one or more of the tasks shown in FIG. 8 could potentially be omitted from an embodiment of the method 800 as long as the intended overall functionality remains intact. It should also be understood that the illustrated method 800 can be stopped at any time, for example, by cancelling it. The method 800 is computer-implemented in that various tasks or steps that are performed in connection with the method 800 may be performed by software, hardware, firmware, or any combination thereof. For illustrative purposes, the following description of the method 800 may refer to elements mentioned above in connection with FIG. 2. In certain embodiments, some or all steps of this process, and/or substantially equivalent steps, are performed by execution of processor-readable instructions stored or included on a processor-readable medium. For instance, in the description of FIG. 8 that follows, the cloud-based computing platform 200, the application platform 210, the user system 212, the database system(s) 220, and the calendar application 230 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 8, an example is described in which a user of a user system performs certain actions by interacting with other elements of the system via the user system 212.

The method 800 begins at 802, where the calendar application 230 automatically detects any existing calendars associated with a user of a particular organization. Each calendar is related to an object type. The calendar application 230 can perform this detection as a background process whenever one or more calendars is displayed in the main GUI of the calendar application 230. In one embodiment, each calendar includes a single object type that is associated with calendar items displayed within that particular calendar. In another embodiment, each calendar can include one or more object types that are associated with calendar items displayed within that particular calendar. Further, as described above, a user of the calendar application 230 can have more than one calendar, and in some cases, a user can choose to display more than one calendar in the main UI of the calendar application 230 at the same time (e.g., if the user configures the calendar application 230 to simultaneously display more than one calendar). At 802, the calendar application 230 also dynamically determines different object types that are associated with calendar items that are displayed in each of the existing calendars that were detected.

At 804, the calendar application 230 generates a new object creation UI element that includes a list of the different object types that were detected at 802. The different object types are included as options that can be selected by a user and used to create a new instance of an object. The object types included in the list of the different object types can include a variety of different standard objects for the cloud computing platform (e.g., that include one or more pre-defined fields that are common for each organization) and a variety of different custom objects (e.g., that include one or more custom fields defined by the user or the particular organization for each custom object). As such, the list of standard and custom object types can be compiled from calendar(s) that are specific to that user's org At 806, the user of the user system 212 selects the new object creation UI element, and at 808, the calendar application 230 displays the list of the different object types that can be created as, for example, a drop-down menu that is displayed within the context of the main UI 214 of the calendar application 230.

At 810, the user of the user system 212 selects one of the different object types from the list to trigger creation of an instance of the object in the cloud computing platform. This is all done from within the context of the main UI 214 of the calendar application 230.

Figure 9:
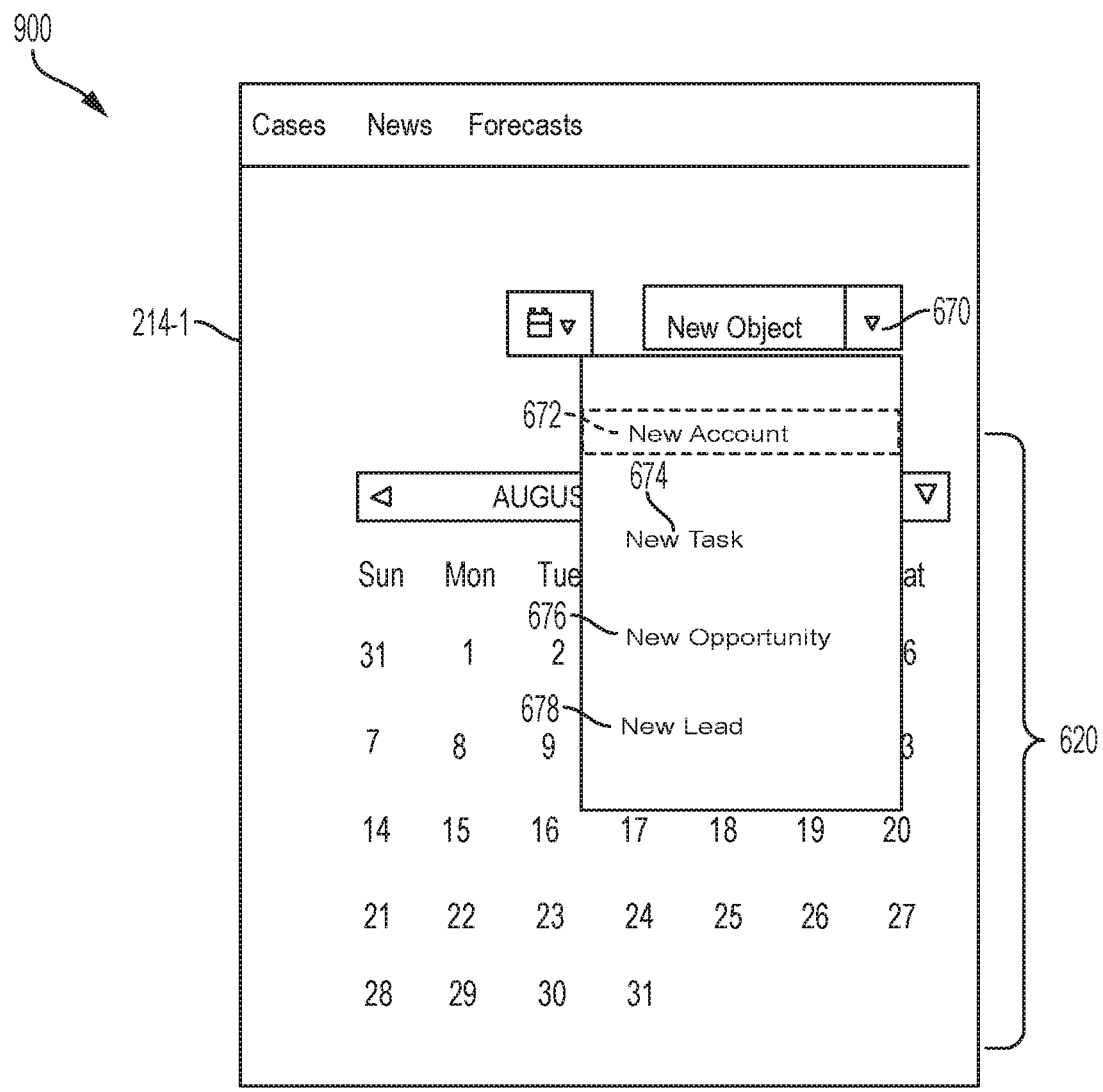
FIG. 9 is a screenshot that shows a region of the main UI that is shown in FIG. 6, and illustrates a non-limiting example of a new object creation UI element in accordance with an exemplary implementation of the disclosed embodiments.

FIG. 9 is a screenshot 900 that shows a region 214-1 of the main UI 214 that is shown in FIG. 6, and illustrates a non-limiting example of a new object creation UI element 670 in accordance with an exemplary implementation of the disclosed embodiments. In this example, the new object creation UI element 670 includes a list of the different object types 672 . . . 678 that were detected including an account object type 672 that can be selected to create a new instance of an account object, a task object type 674 that can be selected to create a new instance of a task object, an opportunity object type 676 that can be selected to create a new instance of an opportunity object, and lead object type 678 that can be selected to create a new instance of an opportunity object. It should be appreciated that the object types included in the list shown in FIG. 9 are non-limiting and that any number of the different object types could be included for variety of different standard objects such as those used in conjunction with the Force.com platform, and/or a variety of different custom objects that are defined by the organization (e.g., user or admin of the org). As explained above, a user can select one of the different object types 672 . . . 678 from the drop-down menu for the new object creation UI element 670 to either initiate creation of a new instance of the selected object or to automatically create a new instance of the selected object. In example illustrated in FIG. 9, it is assumed that the user of the user system 212 selects a task object type 674 from the list of the different object types 672 . . . 678 that is displayed within the context of the main UI 214 of the calendar application 230. This selection will by the user of the user system 212 can either trigger creation of an instance of the task object in the database system of the cloud computing platform. To complete creation of the instance of the object within the cloud computing platform.

Referring again to FIG. 8, the calendar application 230 displays or presents (at 812 of FIG. 8) an object creation template for creation of the instance of the object. The object creation template can be any type of user interface element that can be used as part of an object creation process.

For example, in one embodiment, the object creation template can be implemented as a window (e.g., a pop-up window) that appears overlying the calendar context (or the main UI 214 of the calendar application 230). The window can include one or more UI elements such as menus and fillable fields, etc. that allow a user to input any information needed to create the instance of the object. In one implementation, the window used to implement the object creation template can a modal window or equivalent graphical control element that overlays the main window of the calendar application's main UI, and forces the user to act on it before the user can resume using the main window of the calendar application.

In another embodiment, the object creation template can be implemented using a wizard or equivalent UI feature that guides the user through the creation process with step-by-step instructions that are presented within the calendar application's main UI window that displays the calendar. For example, the wizard feature can present various dialog boxes that lead the user through a series of well-defined steps to create the instance of the object.

Figure 10:
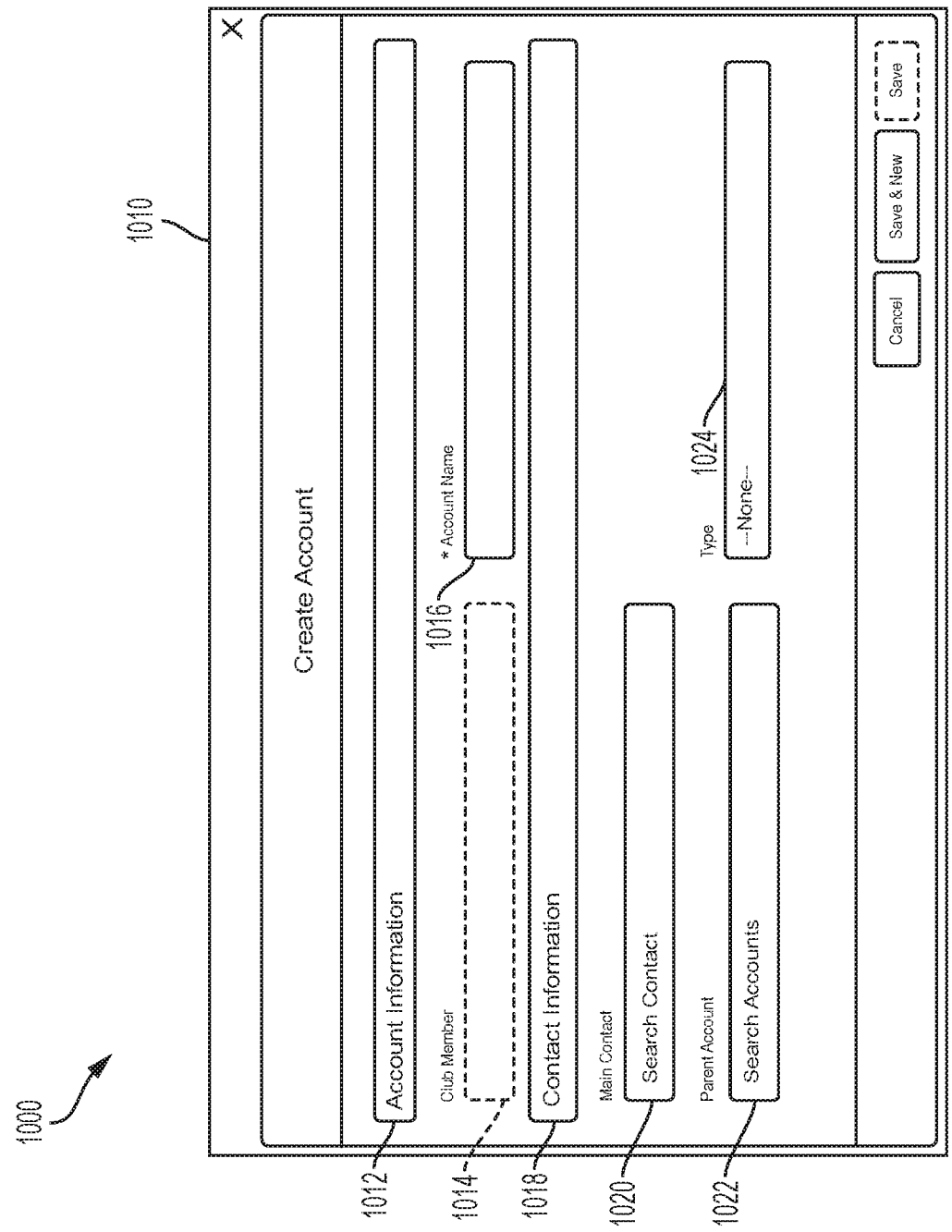
FIG. 10 is a screenshot that shows one implementation of an object creation template in accordance with an exemplary implementation of the disclosed embodiments.

FIG. 10 is a screenshot 1000 that shows one implementation of an object creation template in accordance with an exemplary implementation of the disclosed embodiments. In particular, FIG. 10 shows a modal window 1010 that can be displayed overlying the calendar context or the main UI 214 (not shown) of FIG. 6. The modal window 1010 can be used to create a new instance of an account object based on inputs from the user. In this example, the new instance of the account object can be created based on as account information 1012 and contact information 1018. The account information 1012 can entered in the fields for the club member 1014 and the account name 1016 of the account. The contact information 1018 can be entered in the fields for the main contact 1020 for the account, the parent account 1022, and the type 1024 of account. The main contact 1020 and parent account 1022 fields are searchable meaning that they allow the user to search contacts and accounts records for the information to be entered. When the user has finished completing the information required to create this instance of the account object (or alternatively to update this instance of the account object), the user can select the save button. Optionally, if the user also wants to create another new instance of an account object (e.g., that is unrelated to the current instance of the account object that the user is providing information for in the 1010), the user can select the save & new button. In the event the user does not want to create a new instance of an account object, the user can select the cancel button.

Figure 11:
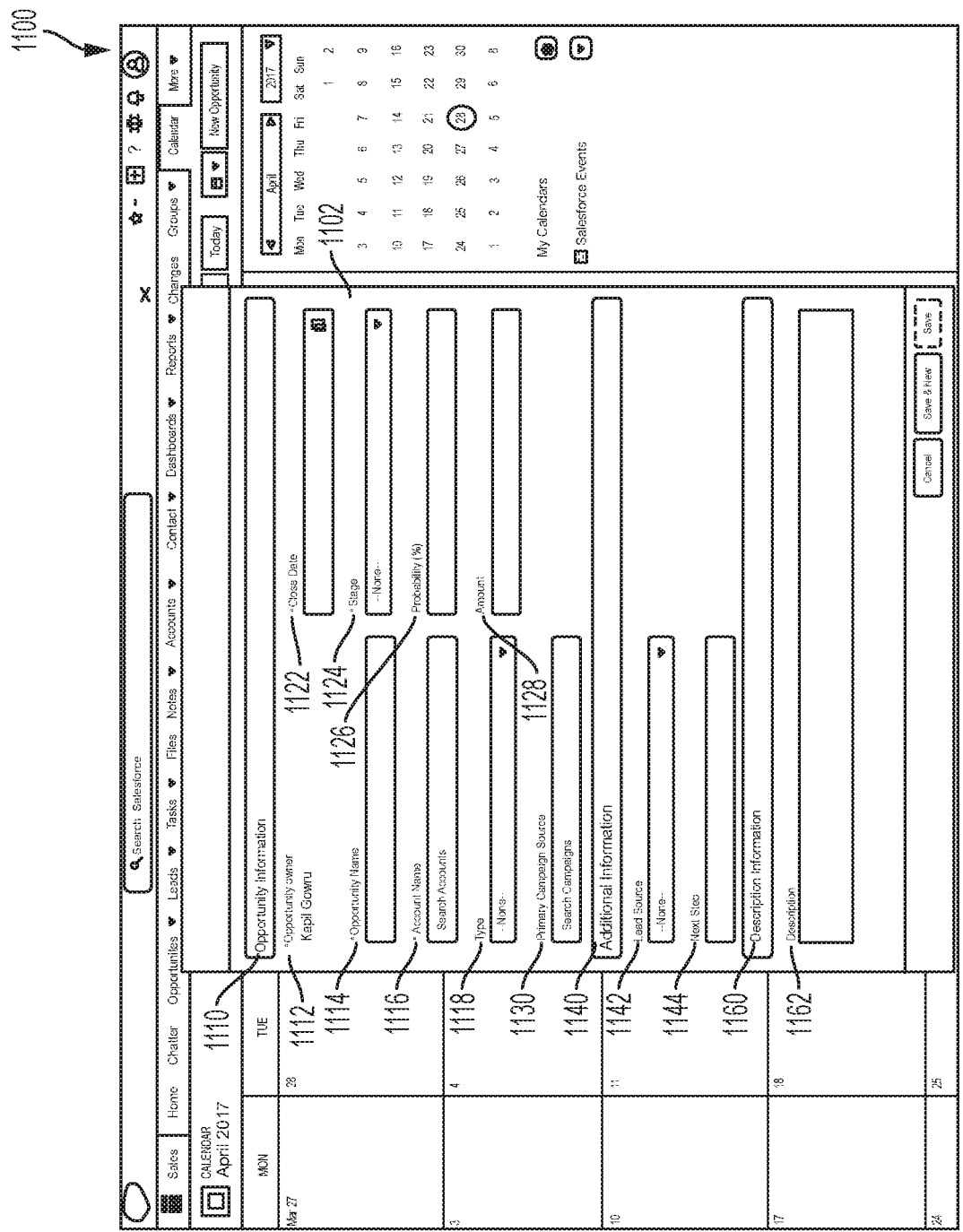
FIG. 11 is a screenshot that shows another implementation of an object creation template in accordance with another exemplary implementation of the disclosed embodiments.

FIG. 11 is a screenshot 1100 that shows another implementation of an object creation template in accordance with another exemplary implementation of the disclosed embodiments. The screenshot 1100 shows a modal window 1102 that can be displayed overlying the calendar context or the main UI 214 of FIG. 6. The modal window 1102 can be used to create a new instance of an opportunity object based on inputs from the user. In this example, the new instance of the opportunity object can be created based on opportunity information 1110, additional information 1140, and description information 1160 that allows the user to input information that describes specific details regarding the opportunity. The opportunity information 1110 can include various fields used by the user to input information. In this example, the opportunity information 1110 can include an opportunity owner field 1112 used to specify who the opportunity owner is, an opportunity name field 1114 used to specify a name for the opportunity, an account name field 1116 that allows the user to search for and specify a name of the account, a type field 1118 that allows the user to specify the type of the opportunity, a close date field 1122 that allows the user to specify a closing date for the opportunity, a stage field 1124 that allows the user to specify the current stage of the opportunity, a probability field 1126 that allows the user to specify the probability of closing on this opportunity, an amount field 1128 that allows the user to specify the monetary value of the opportunity, and primary campaign source field 1130 that allows the user to specify the primary campaign that is the source of the opportunity. The additional information 1140 can include a lead source field 1142 that allows the user to specify the source of the lead, and a next step field 1144 that allows the user to specify the next step for the opportunity. In this example, the description information 1160 includes a description field 1162 that allows the user to input information that describes details regarding the opportunity.

It should be appreciated that these are only two examples and that the object creation template can be tweaked or configured to request any type of information that the organization desires. Depending on the implementation, the user, org admin or anyone could request that additional fields be added to the object creation template. As an example, to create an instance of an event object, the object creation template might request that the user enter information such as information pertaining to the instance of the task object such as: who this task is assigned to, the date and time the task has been completed (only saved if the task has been completed), a checkbox indicate whether or not the quality of performance for this task was acceptable, a fillable field that allows the user to describe or update the subject that the task relates to, another fillable field that allows a user to provide other comments relating to this instance of the task object, hours remaining to complete the task, starting hours allocated to complete the task, actual hours to complete the task, and status of the task and a variety of other information. As another example, to create a new instance of an event object, an objection creation template could be provided that allows a user to input calendar details and other description information that allow the user to input information that describes details regarding the event. The calendar details could include, for example, information such as who the event is assigned to or by, the subject of the event, the start date/time and the end/date time, a field to specify the API name of the quick action as a unique identifier, a field to specify what the event is related to, etc. As such, it should be appreciated that the content of an object creation template is highly-dependent upon the type of object that the user is creating, and even for standard objects, a user or organization can customize the object creation template used to create instances of those standard objects.

Referring again to FIG. 8, at 814, the user inputs information requested by the object creation template, and completes creation of the instance of the object, for example, by hitting a save button to save the user inputs to the object creation template to create the instance of the object within the cloud computing platform. As such, the new instance of the object can be created from within the context of the calendar application (i.e., without leaving the main user interface 214 of the calendar application 230).

Depending on the characteristics of the new instance of the object and whether it is calendarable, the new instance of the object can optionally be added to the calendar as a calendar item (e.g., the calendar item is the instance of the object), or can be associated with an existing calendar item (e.g., the new instance of the object represents data associated with the calendar item). To explain further, many, but not all, types of objects are calendarable. In other words, an object must meet certain minimum requirements in order to be displayed within a calendar as part of a calendar item. For example, any object type that has a date and/or time field is calendarable.

When the newly created instance of the object is calendarable, the method 800 proceeds to 816, where the calendar application 230 creates a calendar item that includes the instance of the object as data associated with the calendar item, and then displays the calendar item within the main user interface of the calendar application (at 818). In one implementation, the calendar item can be a new calendar item that includes the newly created instance of the object. In another implementation, the calendar item can be an updated version of an existing calendar item that includes the newly created instance of the object as data associated with the existing calendar item.

Figure 12:
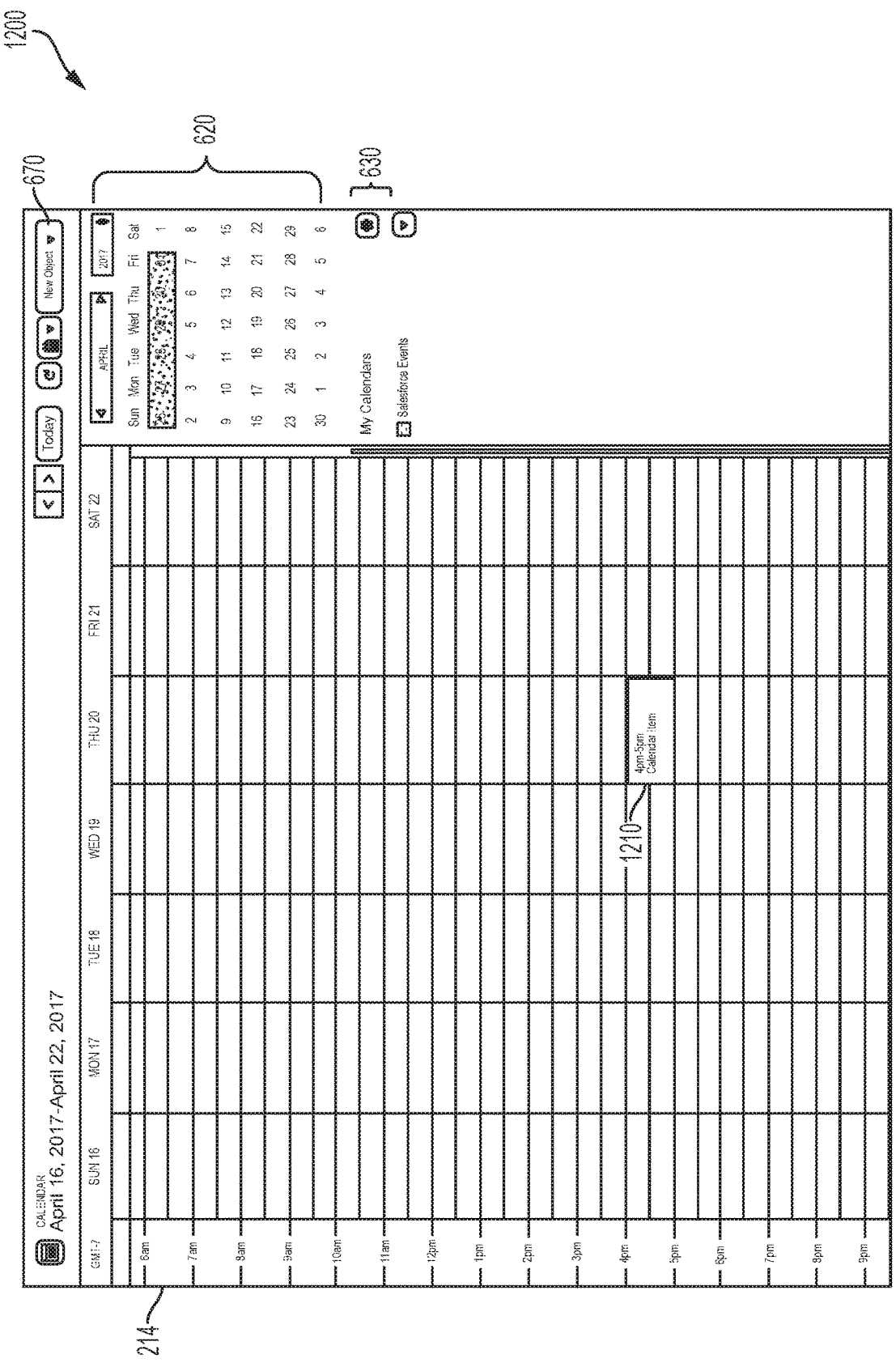
FIG. 12 is a screenshot that shows an example of a calendar item that is displayed with the calendar context and was created in accordance with an exemplary implementation of the disclosed embodiments.

FIG. 12 is a screenshot 1200 that shows an example of a calendar item 1210 that is displayed within the calendar context and was created in accordance with an exemplary implementation of the disclosed embodiments. In this example, the calendar item 1210 includes a record that is calendarable from 5 PM to 6 PM on Apr. 20, 2017. The record could be, for example, an instance of an account object that was created in FIG. 10, or an instance of an opportunity object that was created in FIG. 11.

The following description is of one example of a system in which the features described above may be implemented. The components of the system described below are merely one example and should not be construed as limiting. The features described above with respect to FIGS. 1-12 may be implemented in any other type of computing environment, such as one with multiple servers, one with a single server, a multi-tenant server environment, a single-tenant server environment, or some combination of the above.

Figure 13:
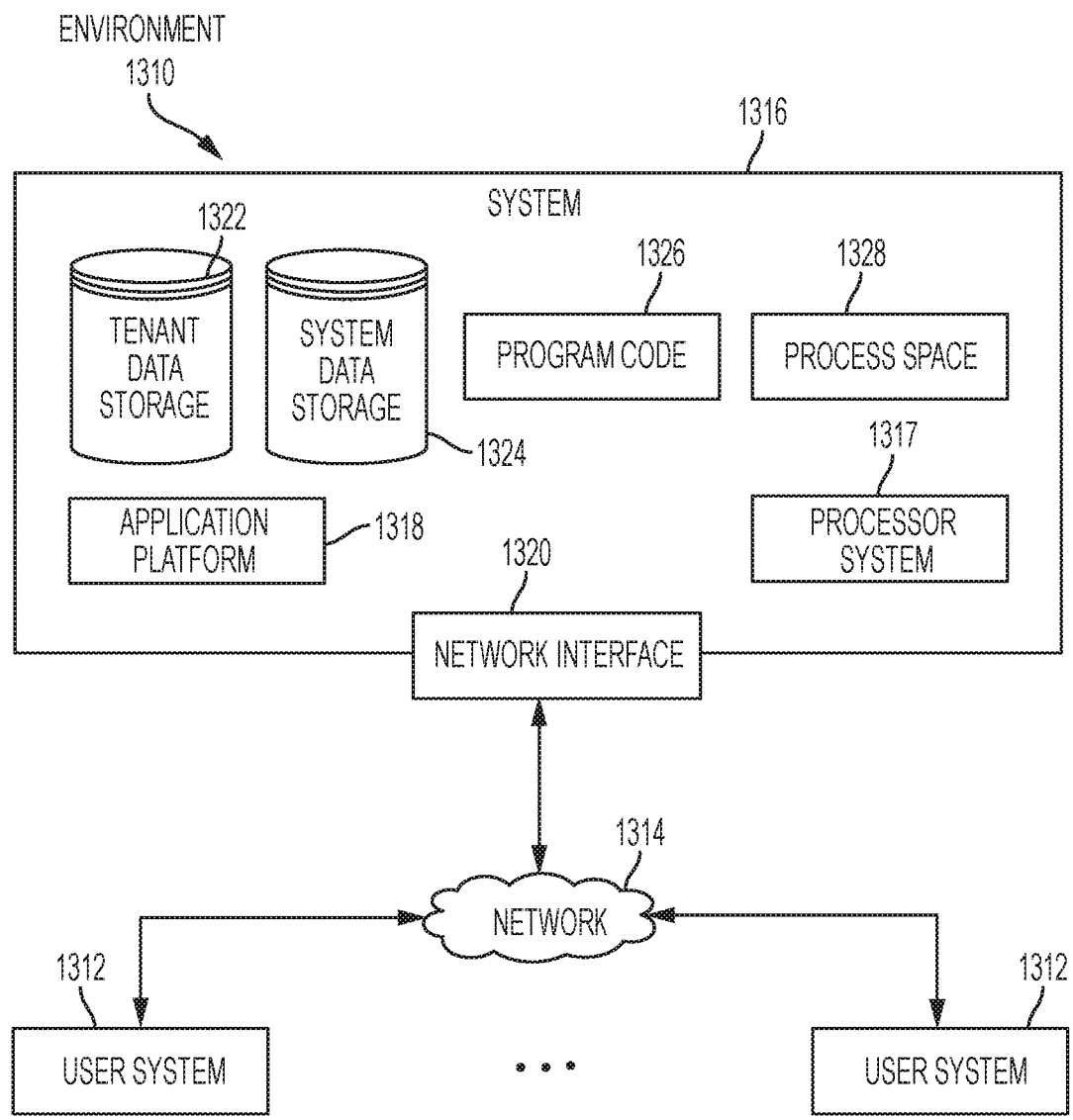
FIG. 13 shows a block diagram of an example of an environment in which an on-demand database service can be used in accordance with some implementations.

FIG. 13 shows a block diagram of an example of an environment 1310 in which an on-demand database service can be used in accordance with some implementations. The environment 1310 includes user systems 1312, a network 1314, a database system 1316 (also referred to herein as a "cloud-based system"), a processor system 1317, an application platform 1318, a network interface 1320, tenant database 1322 for storing tenant data, system database 1324 for storing system data, program code 1326 for implementing various functions of the system 1316, and process space 1328 for executing database system processes and tenant-specific processes, such as running applications as part of an application hosting service. In some other implementations, environment 1310 may not have all of these components or systems, or may have other components or systems instead of, or in addition to, those listed above.

In some implementations, the environment 1310 is an environment in which an on-demand database service exists. An on-demand database service, such as that which can be implemented using the system 1316, is a service that is made available to users outside of the enterprise(s) that own, maintain or provide access to the system 1316. As described above, such users generally do not need to be concerned with building or maintaining the system 1316. Instead, resources provided by the system 1316 may be available for such users' use when the users need services provided by the system 1316; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 1318 can be a framework that allows the applications of system 1316 to execute, such as the hardware or software infrastructure of the system 1316.

In some implementations, the application platform 1318 enables the creation, management and execution of one or more applications developed by the provider of the on-demand database service, users accessing the on-demand database service via user systems 1312, or third party application developers accessing the on-demand database service via user systems 1312.

In some implementations, the system 1316 implements a web-based customer relationship management (CRM) system. For example, in some such implementations, the system 1316 includes application servers configured to implement and execute CRM software applications as well as provide related data, code, forms, renderable web pages and documents and other information to and from user systems 1312 and to store to, and retrieve from, a database system related data, objects, and Web page content. In some MTS implementations, data for multiple tenants may be stored in the same physical database object in tenant database 1322. In some such implementations, tenant data is arranged in the storage medium(s) of tenant database 1322 so that data of one tenant is kept logically separate from that of other tenants so that one tenant does not have access to another tenant's data, unless such data is expressly shared. The system 1316 also implements applications other than, or in addition to, a CRM application. For example, the system 1316 can provide tenant access to multiple hosted (standard and custom) applications, including a CRM application. User (or third party developer) applications, which may or may not include CRM, may be supported by the application platform 1318. The application platform 1318 manages the creation and storage of the applications into one or more database objects and the execution of the applications in one or more virtual machines in the process space of the system 1316.

According to some implementations, each system 1316 is configured to provide web pages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 1314 can be or include any network or combination of networks of systems or devices that communicate with one another. For example, the network 1314 can be or include any one or any combination of a LAN (local area network), WAN (wide area network), telephone network, wireless network, cellular network, point-to-point network, star network, token ring network, hub network, or other appropriate configuration. The network 1314 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 1312 can communicate with system 1316 using TCP/IP and, at a higher network level, other common Internet protocols to communicate, such as HTTP, FTP, AFS, WAP, etc. In an example where HTTP is used, each user system 1312 can include an HTTP client commonly referred to as a "web browser" or simply a "browser" for sending and receiving HTTP signals to and from an HTTP server of the system 1316. Such an HTTP server can be implemented as the sole network interface 1320 between the system 1316 and the network 1314, but other techniques can be used in addition to or instead of these techniques. In some implementations, the network interface 1320 between the system 1316 and the network 1314 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 1312 can be implemented as any computing device(s) or other data processing apparatus or systems usable by users to access the database system 1316. For example, any of user systems 1312 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 1312 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 1316) of the user system 1312 to access, process and view information, pages and applications available to it from the system 1316 over the network 1314.

Each user system 1312 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 1312 in conjunction with pages, forms, applications and other information provided by the system 1316 or other systems or servers. For example, the user interface device can be used to access data and applications hosted by system 1316, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 1312 may differ in their respective capacities, and the capacity of a particular user system 1312 can be entirely determined by permissions (permission levels) for the current user of such user system. For example, where a salesperson is using a particular user system 1312 to interact with the system 1316, that user system can have the capacities allotted to the salesperson. However, while an administrator is using that user system 1312 to interact with the system 1316, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 1312 and some or all of its components are operator-configurable using applications, such as a browser, including computer code executed using a central processing unit (CPU) such as an Intel Pentium® processor or the like. Similarly, the system 1316 (and additional instances of an MTS, where more than one is present) and all of its components can be operator-configurable using application(s) including computer code to run using the processor system 1317, which may be implemented to include a CPU, which may include an Intel Pentium® processor or the like, or multiple CPUs.

The system 1316 includes tangible computer-readable media having non-transitory instructions stored thereon/in that are executable by or used to program a server or other computing system (or collection of such servers or computing systems) to perform some of the implementation of processes described herein. For example, computer program code 1326 can implement instructions for operating and configuring the system 1316 to intercommunicate and to process web pages, applications and other data and media content as described herein. In some implementations, the computer code 1326 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT®, ACTIVEX®, any other scripting language, such as VBSCRIPT®, and many other programming languages as are well known may be used. (Java™ is a trademark of Sun Microsystems, Inc.).

Figure 14:
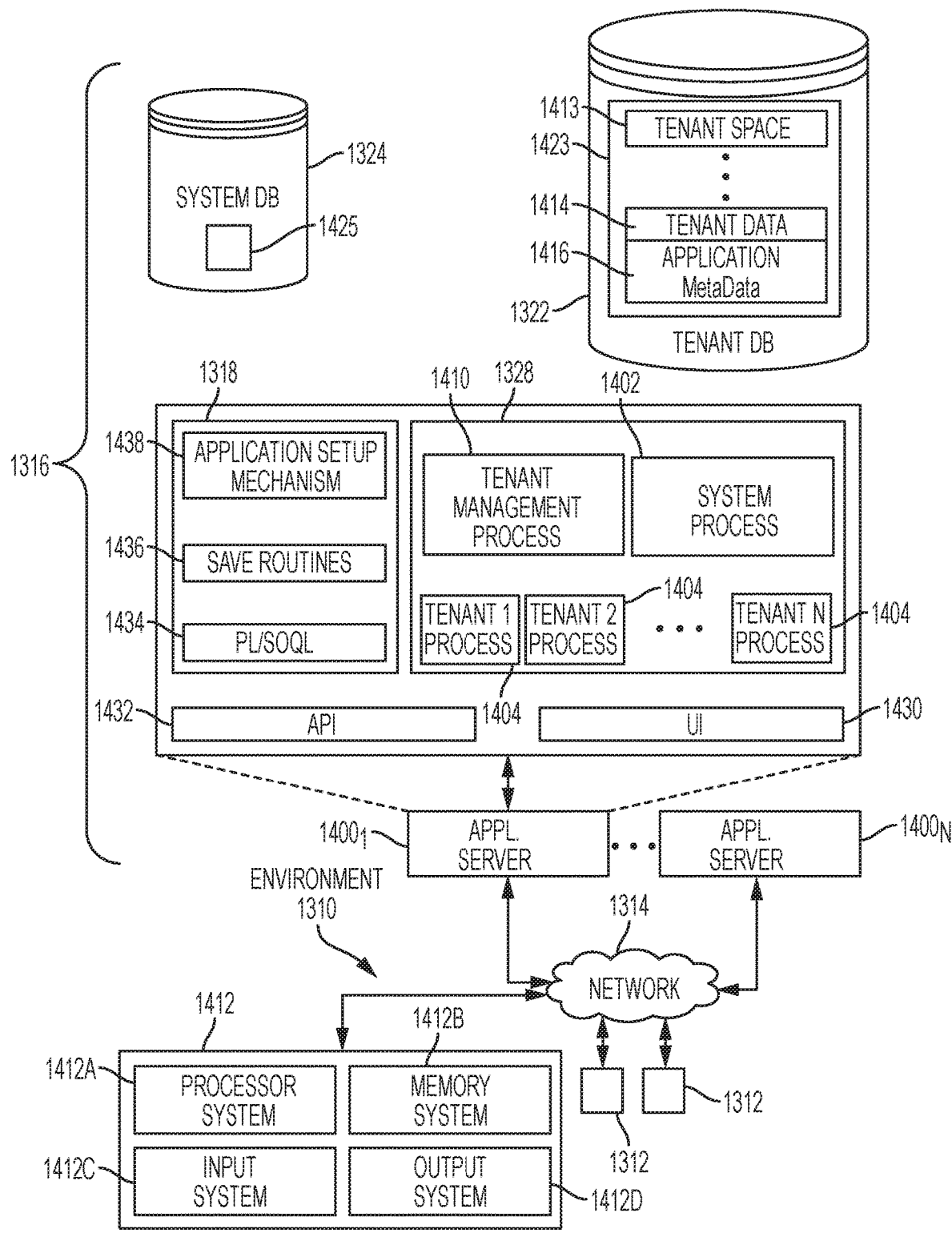
FIG. 14 shows a block diagram of example implementations of elements of FIG. 13 and example interconnections between these elements according to some implementations.

FIG. 14 shows a block diagram of example implementations of elements of FIG. 13 and example interconnections between these elements according to some implementations. That is, FIG. 14 also illustrates environment 1310, but FIG. 14, various elements of the system 1316 and various interconnections between such elements are shown with more specificity according to some more specific implementations. Elements from FIG. 13 that are also shown in FIG. 14 will use the same reference numbers in FIG. 14 as were used in FIG. 13. Additionally, in FIG. 14, the user system 1312 includes a processor system 1412A, a memory system 1412B, an input system 1412C, and an output system 1412D. The processor system 1412A can include any suitable combination of one or more processors. The memory system 1412B can include any suitable combination of one or more memory devices. The input system 1412C can include any suitable combination of input devices, such as one or more touchscreen interfaces, keyboards, mice, trackballs, scanners, cameras, or interfaces to networks. The output system 1412D can include any suitable combination of output devices, such as one or more display devices, printers, or interfaces to networks.

In FIG. 14, the network interface 1320 of FIG. 13 is implemented as a set of HTTP application servers 14001-1400N. Each application server 1400, also referred to herein as an "app server," is configured to communicate with tenant database 1322 and the tenant data 1423 therein, as well as system database 1324 and the system data 1425 therein, to serve requests received from the user systems 1412. The tenant data 1423 can be divided into individual tenant storage spaces 1413, which can be physically or logically arranged or divided. Within each tenant storage space 1413, tenant data 1414 and application metadata 1416 can similarly be allocated for each user. For example, a copy of a user's most recently used (MRU) items can be stored to user storage 1414. Similarly, a copy of MRU items for an entire organization that is a tenant can be stored to tenant storage space 1413.

The process space 1328 includes system process space 1402, individual tenant process spaces 1404 and a tenant management process space 1410. The application platform 1318 includes an application setup mechanism 1438 that supports application developers' creation and management of applications. Such applications and others can be saved as metadata into tenant database 1322 by save routines 1436 for execution by subscribers as one or more tenant process spaces 1404 managed by tenant management process 1410, for example. Invocations to such applications can be coded using PL/SOQL 1434, which provides a programming language style interface extension to API 1432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 1316 of FIG. 14 also includes a user interface (UI) 1430 and an application programming interface (API) 1432 to system 1316 resident processes to users or developers at user systems 1412. In some other implementations, the environment 1310 may not have the same elements as those listed above or may have other elements instead of, or in addition to, those listed above.

Each application server 1400 can be communicably coupled with tenant database 1322 and system database 1324, for example, having access to tenant data 1423 and system data 1425, respectively, via a different network connection. For example, one application server 14001 can be coupled via the network 1314 (for example, the Internet), another application server 1400N can be coupled via a direct network link, and another application server (not illustrated) can be coupled by yet a different network connection. Transfer Control Protocol and Internet Protocol (TCP/IP) are examples of typical protocols that can be used for communicating between application servers 1400 and the system 1316. However, it will be apparent to one skilled in the art that other transport protocols can be used to optimize the system 1316 depending on the network interconnections used.

In some implementations, each application server 1400 is configured to handle requests for any user associated with any organization that is a tenant of the system 1316.

Because it can be desirable to be able to add and remove application servers 1400 from the server pool at any time and for various reasons, in some implementations there is no server affinity for a user or organization to a specific application server 1400. In some such implementations, an interface system implementing a load balancing function (for example, an F5 Big-IP load balancer) is communicably coupled between the application servers 1400 and the user systems 1412 to distribute requests to the application servers 1400. In one implementation, the load balancer uses a least-connections algorithm to route user requests to the application servers 1400. Other examples of load balancing algorithms, such as round robin and observed-response-time, also can be used. For example, in some instances, three consecutive requests from the same user could hit three different application servers 1400, and three requests from different users could hit the same application server 1400. In this manner, by way of example, system 1316 can be a multi-tenant system in which system 1316 handles storage of, and access to, different objects, data and applications across disparate users and organizations.

In one example storage use case, one tenant can be a company that employs a sales force where each salesperson uses system 1316 to manage aspects of their sales. A user can maintain contact data, leads data, customer follow-up data, performance data, goals and progress data, etc., all applicable to that user's personal sales process (for example, in tenant database 1322). In an example of a MTS arrangement, because all of the data and the applications to access, view, modify, report, transmit, calculate, etc., can be maintained and accessed by a user system 1412 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 1316 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 1316 also can maintain system level data usable by multiple tenants or other data. Such system level data can include industry reports, news, postings, and the like that are sharable among tenants.

In some implementations, the user systems 1412 (which also can be client systems) communicate with the application servers 1400 to request and update system-level and tenant-level data from the system 1316. Such requests and updates can involve sending one or more queries to tenant database 1322 or system database 1324. The system 1316 (for example, an application server 1400 in the system 1316) can automatically generate one or more SQL statements (for example, one or more SQL queries) designed to access the desired information. System database 1324 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 15A:
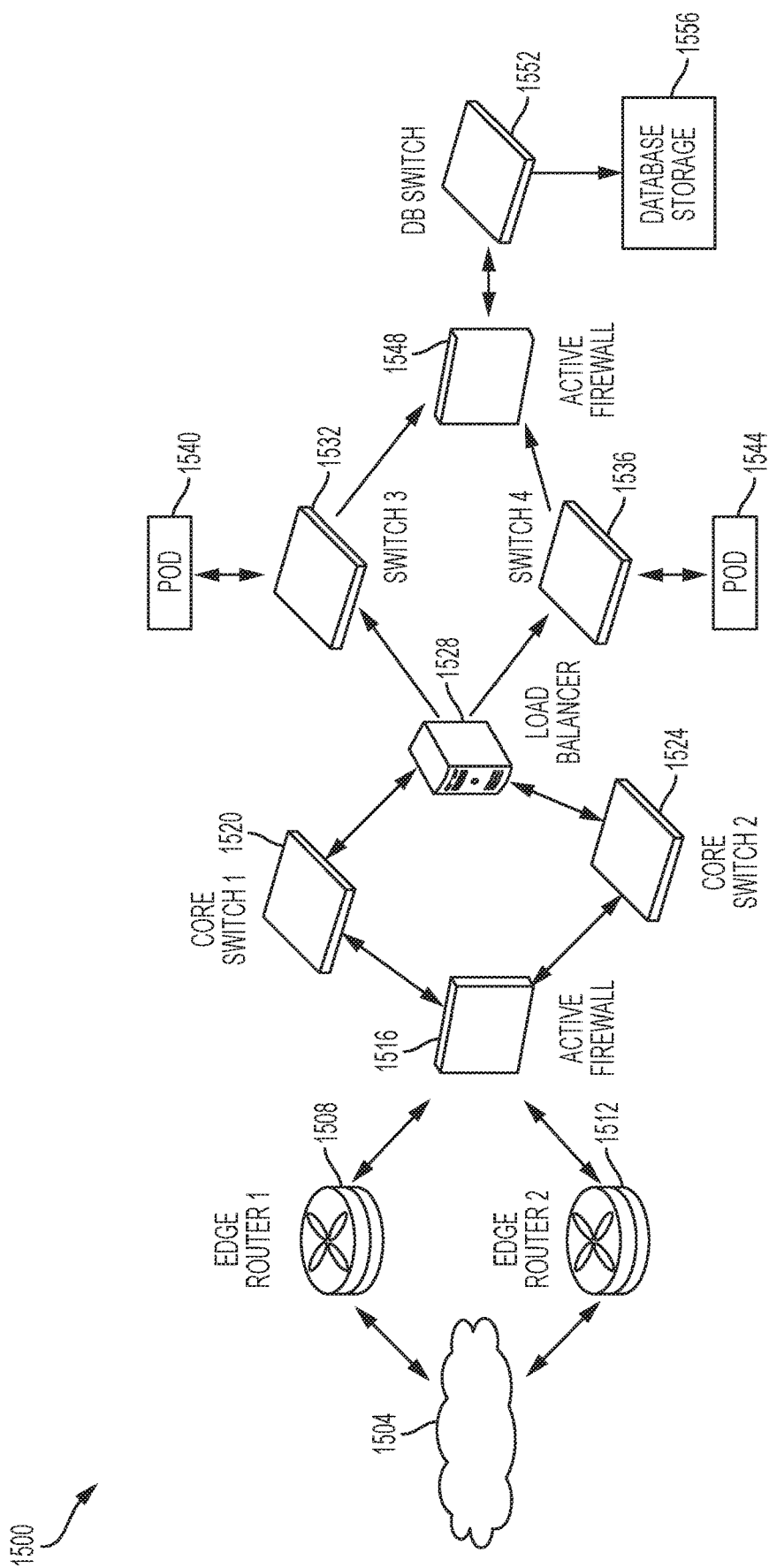
FIG. 15A shows a system diagram illustrating example architectural components of an on-demand database service environment according to some implementations.

FIG. 15A shows a system diagram illustrating example architectural components of an on-demand database service environment 1500 according to some implementations. A client machine communicably connected with the cloud 1504, generally referring to one or more networks in combination, as described herein, can communicate with the on-demand database service environment 1500 via one or more edge routers 1508 and 1512. A client machine can be any of the examples of user systems 12 described above. The edge routers can communicate with one or more core switches 1520 and 1524 through a firewall 1516. The core switches can communicate with a load balancer 1528, which can distribute server load over different pods, such as the pods 1540 and 1544. The pods 1540 and 1544, which can each include one or more servers or other computing resources, can perform data processing and other operations used to provide on-demand services. Communication with the pods can be conducted via pod switches 1532 and 1536. Components of the on-demand database service environment can communicate with database storage 1556 through a database firewall 1548 and a database switch 1552.

Figure 15B:
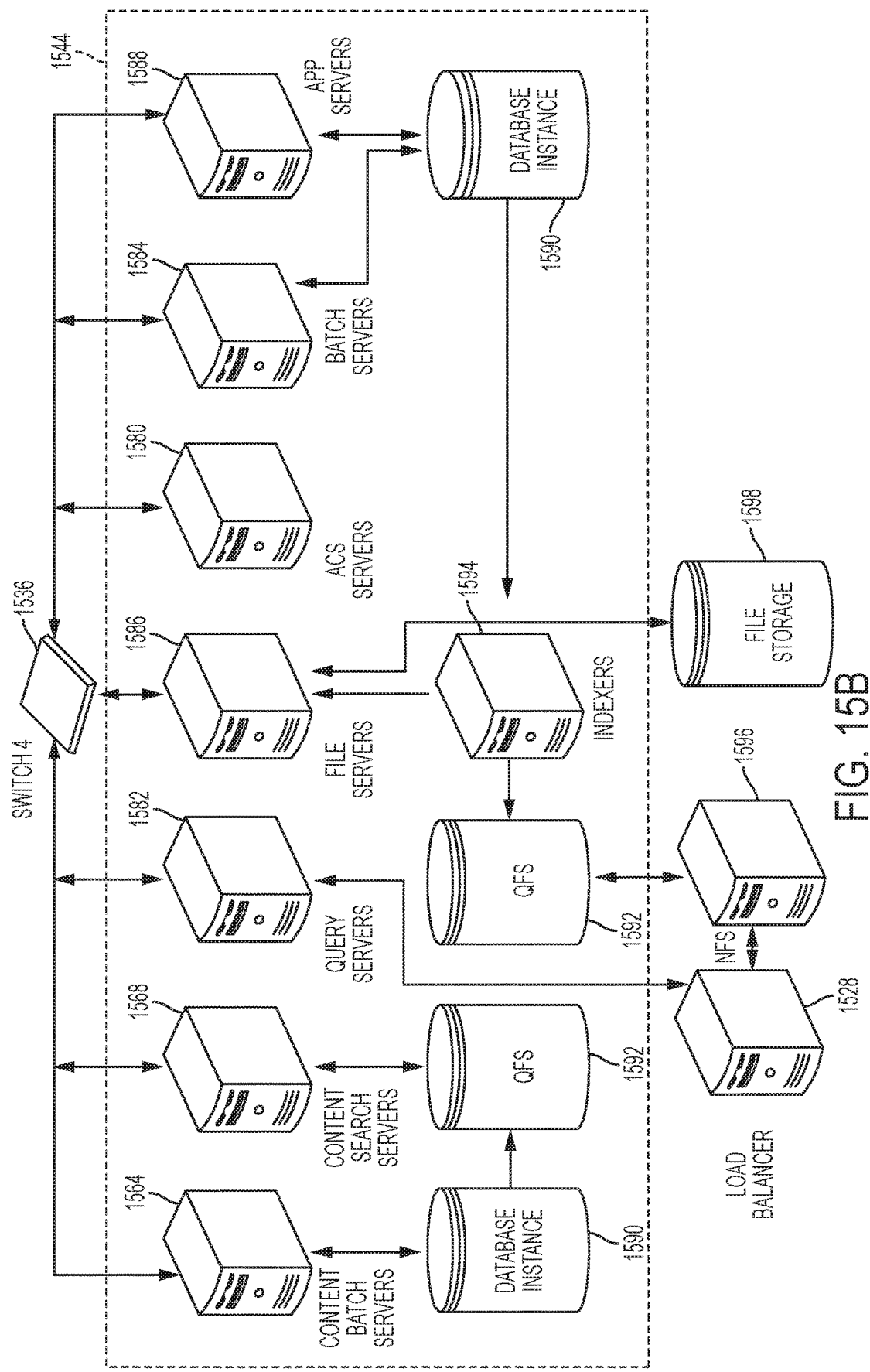
FIG. 15B shows a system diagram further illustrating example architectural components of an on-demand database service environment according to some implementations.

As shown in FIGS. 15A and 15B, accessing an on-demand database service environment can involve communications transmitted among a variety of different hardware or software components. Further, the on-demand database service environment 1500 is a simplified representation of an actual on-demand database service environment. For example, while only one or two devices of each type are shown in FIGS. 15A and 15B, some implementations of an on-demand database service environment can include anywhere from one to several devices of each type. Also, the on-demand database service environment need not include each device shown in FIGS. 15A and 15B, or can include additional devices not shown in FIGS. 15A and 15B.

Additionally, it should be appreciated that one or more of the devices in the on-demand database service environment 1500 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1504 is intended to refer to a data network or multiple data networks, often including the Internet. Client machines communicably connected with the cloud 1504 can communicate with other components of the on-demand database service environment 1500 to access services provided by the on-demand database service environment. For example, client machines can access the on-demand database service environment to retrieve, store, edit, or process information. In some implementations, the edge routers 1508 and 1512 route packets between the cloud 1504 and other components of the on-demand database service environment 1500. For example, the edge routers 1508 and 1512 can employ the Border Gateway Protocol (BGP). The BGP is the core routing protocol of the Internet. The edge routers 1508 and 1512 can maintain a table of IP networks or 'prefixes', which designate network reachability among autonomous systems on the Internet.

In some implementations, the firewall 1516 can protect the inner components of the on-demand database service environment 1500 from Internet traffic. The firewall 1516 can block, permit, or deny access to the inner components of the on-demand database service environment 1500 based upon a set of rules and other criteria. The firewall 1516 can act as one or more of a packet filter, an application gateway, a stateful filter, a proxy server, or any other type of firewall.

In some implementations, the core switches 1520 and 1524 are high-capacity switches that transfer packets within the on-demand database service environment 1500. The core switches 1520 and 1524 can be configured as network bridges that quickly route data between different components within the on-demand database service environment. In some implementations, the use of two or more core switches 1520 and 1524 can provide redundancy or reduced latency.

In some implementations, the pods 1540 and 1544 perform the core data processing and service functions provided by the on-demand database service environment. Each pod can include various types of hardware or software computing resources. An example of the pod architecture is discussed in greater detail with reference to FIG. 15B. In some implementations, communication between the pods 1540 and 1544 is conducted via the pod switches 1532 and 1536. The pod switches 1532 and 1536 can facilitate communication between the pods 1540 and 1544 and client machines communicably connected with the cloud 1504, for example via core switches 1520 and 1524. Also, the pod switches 1532 and 1536 may facilitate communication between the pods 1540 and 1544 and the database storage 1556. In some implementations, the load balancer 1528 can distribute workload between the pods 1540 and 1544. Balancing the on-demand service requests between the pods can assist in improving the use of resources, increasing throughput, reducing response times, or reducing overhead. The load balancer 1528 may include multilayer switches to analyze and forward traffic.

In some implementations, access to the database storage 1556 is guarded by a database firewall 1548. The database firewall 1548 can act as a computer application firewall operating at the database application layer of a protocol stack. The database firewall 1548 can protect the database storage 1556 from application attacks such as structure query language (SQL) injection, database rootkits, and unauthorized information disclosure. In some implementations, the database firewall 1548 includes a host using one or more forms of reverse proxy services to proxy traffic before passing it to a gateway router. The database firewall 1548 can inspect the contents of database traffic and block certain content or database requests. The database firewall 1548 can work on the SQL application level atop the TCP/IP stack, managing applications' connection to the database or SQL management interfaces as well as intercepting and enforcing packets traveling to or from a database network or application interface.

In some implementations, communication with the database storage 1556 is conducted via the database switch 1552. The multi-tenant database storage 1556 can include more than one hardware or software components for handling database queries. Accordingly, the database switch 1552 can direct database queries transmitted by other components of the on-demand database service environment (for example, the pods 1540 and 1544) to the correct components within the database storage 1556. In some implementations, the database storage 1556 is an on-demand database system shared by many different organizations as described above with reference to FIG. 13 and FIG. 14.

FIG. 15B shows a system diagram further illustrating example architectural components of an on-demand database service environment according to some implementations. The pod 1544 can be used to render services to a user of the on-demand database service environment 1500. In some implementations, each pod includes a variety of servers or other systems. The pod 1544 includes one or more content batch servers 1564, content search servers 1568, query servers 1582, file force servers 1586, access control system (ACS) servers 1580, batch servers 1584, and app servers 1588. The pod 1544 also can include database instances 1590, quick file systems (QFS) 1592, and indexers 1594. In some implementations, some or all communication between the servers in the pod 1544 can be transmitted via the switch 1536.

In some implementations, the app servers 1588 include a hardware or software framework dedicated to the execution of procedures (for example, programs, routines, scripts) for supporting the construction of applications provided by the on-demand database service environment 1500 via the pod 1544. In some implementations, the hardware or software framework of an app server 1588 is configured to execute operations of the services described herein, including performance of the blocks of various methods or processes described herein. In some alternative implementations, two or more app servers 1588 can be included and cooperate to perform such methods, or one or more other servers described herein can be configured to perform the disclosed methods.

The content batch servers 1564 can handle requests internal to the pod. Some such requests can be long-running or not tied to a particular customer. For example, the content batch servers 1564 can handle requests related to log mining, cleanup work, and maintenance tasks. The content search servers 1568 can provide query and indexer functions. For example, the functions provided by the content search servers 1568 can allow users to search through content stored in the on-demand database service environment. The file force servers 1586 can manage requests for information stored in the File force storage 1598. The File force storage 1598 can store information such as documents, images, and basic large objects (BLOBs). By managing requests for information using the file force servers 1586, the image footprint on the database can be reduced. The query servers 1582 can be used to retrieve information from one or more file storage systems. For example, the query system 1582 can receive requests for information from the app servers 1588 and transmit information queries to the NFS 1596 located outside the pod.

The pod 1544 can share a database instance 1590 configured as a multi-tenant environment in which different organizations share access to the same database. Additionally, services rendered by the pod 1544 may call upon various hardware or software resources. In some implementations, the ACS servers 1580 control access to data, hardware resources, or software resources. In some implementations, the batch servers 1584 process batch jobs, which are used to run tasks at specified times. For example, the batch servers 1584 can transmit instructions to other servers, such as the app servers 1588, to trigger the batch jobs.

In some implementations, the QFS 1592 is an open source file storage system available from Sun Microsystems® of Santa Clara, Calif. The QFS can serve as a rapid-access file storage system for storing and accessing information available within the pod 1544. The QFS 1592 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1568 or indexers 1594 to identify, retrieve, move, or update data stored in the network file storage systems 1596 or other storage systems.

In some implementations, one or more query servers 1582 communicate with the NFS 1596 to retrieve or update information stored outside of the pod 1544. The NFS 1596 can allow servers located in the pod 1544 to access information to access files over a network in a manner similar to how local storage is accessed. In some implementations, queries from the query servers 1582 are transmitted to the NFS 1596 via the load balancer 1528, which can distribute resource requests over various resources available in the on-demand database service environment. The NFS 1596 also can communicate with the QFS 1592 to update the information stored on the NFS 1596 or to provide information to the QFS 1592 for use by servers located within the pod 1544.

In some implementations, the pod includes one or more database instances 1590. The database instance 1590 can transmit information to the QFS 1592. When information is transmitted to the QFS, it can be available for use by servers within the pod 1544 without using an additional database call. In some implementations, database information is transmitted to the indexer 1594. Indexer 1594 can provide an index of information available in the database 1590 or QFS 1592. The index information can be provided to file force servers 1586 or the QFS 1592.

Figure 16:
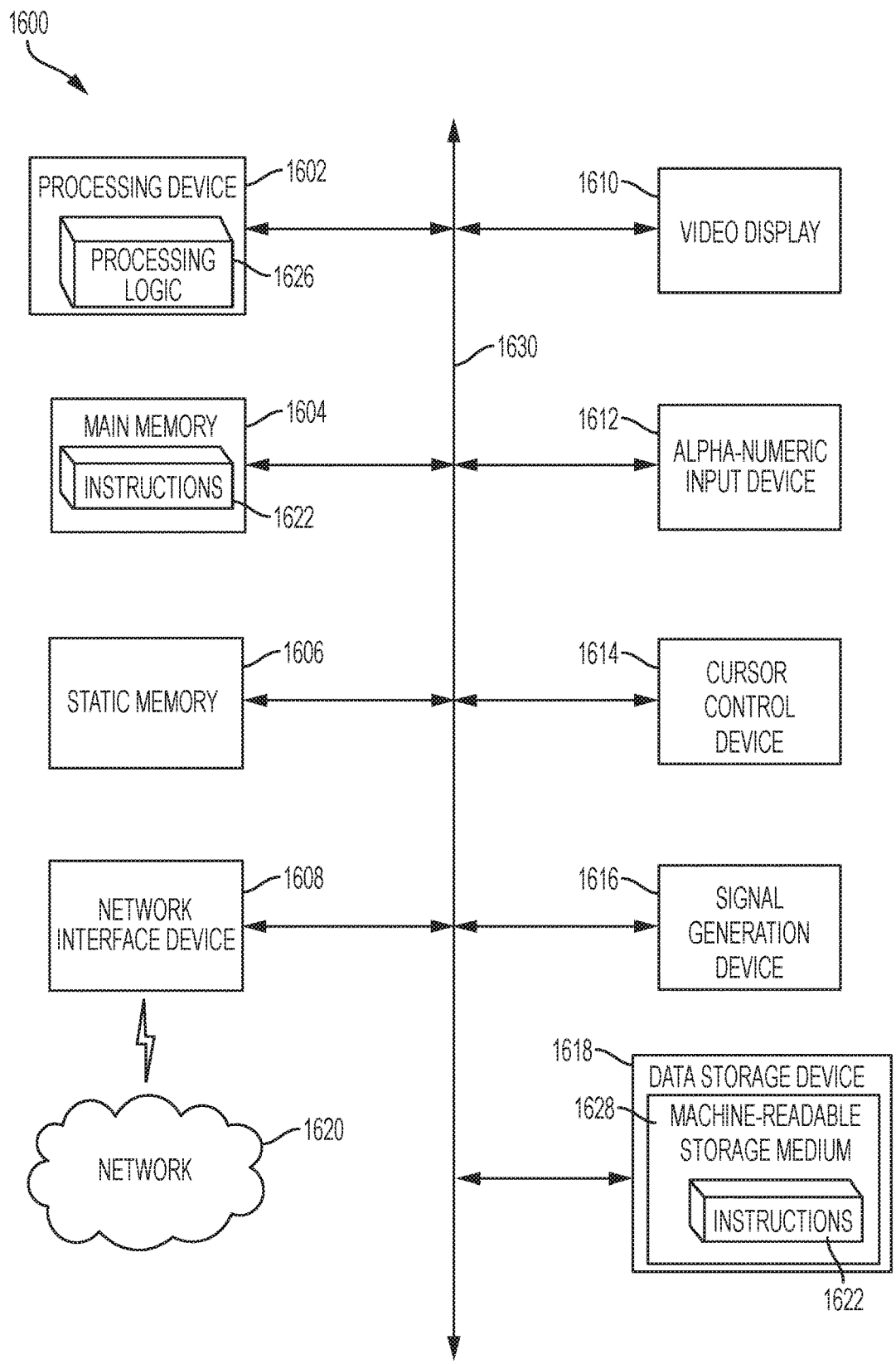
FIG. 16 illustrates a diagrammatic representation of a machine in the exemplary form of a computer system within which a set of instructions, for causing the machine to perform any one or more of the methodologies discussed herein, may be executed.

FIG. 16 illustrates a diagrammatic representation of a machine in the exemplary form of a computer system 1600 within which a set of instructions, for causing the machine to perform any one or more of the methodologies discussed herein, may be executed. The system 1600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1600 may represent application server 110, as shown in FIGS. 2-4 and 6.

The exemplary computer system 1600 includes a processing device (processor) 1602, a main memory 1604 (e.g., read-only memory (ROM), flash memory, dynamic random access memory (DRAM) such as synchronous DRAM (SDRAM)), a static memory 1606 (e.g., flash memory, static random access memory (SRAM)), and a data storage device 1618, which communicate with each other via a bus 1630.

Processing device 1602 represents one or more general-purpose processing devices such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1602 may also be one or more special-purpose processing devices such as an application specific integrated circuit (ASIC), a field programmable gate array (FPGA), a digital signal processor (DSP), network processor, or the like.

The computer system 1600 may further include a network interface device 1608. The computer system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1616 (e.g., a speaker).

The data storage device 1618 may include a computer-readable medium 1628 on which is stored one or more sets of instructions 1622 (e.g., instructions of in-memory buffer service 114) embodying any one or more of the methodologies or functions described herein. The instructions 1622 may also reside, completely or at least partially, within the main memory 1604 and/or within processing logic 1626 of the processing device 1602 during execution thereof by the computer system 1600, the main memory 1604 and the processing device 1602 also constituting computer-readable media. The instructions may further be transmitted or received over a network 1620 via the network interface device 1608.

While the computer-readable storage medium 1628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for creating an instance of an object from within a context of a user interface of a calendar application of a cloud computing platform that serves a plurality of different organizations, the method comprising:

automatically detecting a plurality of existing calendars that are associated with a user of a particular organization of the plurality of different organizations, wherein each calendar is related to at least one object type;

dynamically determining different object types that are associated with calendar items displayed in each of the plurality of the existing calendars that were automatically detected as being associated with the user of the particular organization of the plurality of different organizations and specific to the particular organization, wherein the different object types comprise: standard objects that are defined by the cloud computing platform and that are common for each organization of the plurality of different organizations that utilize the cloud computing platform, wherein each standard object includes one or more pre-defined fields that are common for each organization that utilizes the cloud computing platform, and custom objects that are custom database tables defined by the particular organization and allow the particular organization to store information unique to their particular organization, wherein each custom object includes one or more custom fields defined by the particular organization for that custom object, wherein each instance of an object is storable as a record in a database system of the cloud computing platform;

providing a new object creation user interface (UI) element that includes a list of the different object types that are associated with the user of the particular organization of the plurality of different organizations, wherein the list of the different object types is dynamically defined for that user of that particular organization based on the calendar items displayed in each of the plurality of the existing calendars that were automatically detected as being associated with that user of that particular organization;

in response to selecting the new object creation UI element, displaying the list of the different object types that can be created within the context of the user interface of the calendar application; and in response to selection of one of the different object types, creating, from within the context of the user interface of the calendar application, an instance of the selected object type that is storable as record in a database system of the cloud computing platform, wherein creating comprises: presenting an object creation template for creation of the instance of the object; receiving user inputs via the object creation template; and saving the user inputs to the object creation template to create the instance of the object within the cloud computing platform from within the context of the user interface of the calendar application without leaving the context of the user interface of the calendar application.

2. The method of claim 1, wherein the object creation template comprises:

a window that appears overlying the calendar context, wherein the window comprises one or more elements that allow the user to input any information needed to create the instance of the object.

3. The method of claim 1, wherein the object creation template comprises:

a wizard UI feature that guides the user through a series of steps to create the instance of the object.

4. The method of claim 1, wherein the standard objects are customer relationship management (CRM) entities having a record type defined within the could computing platform, wherein the standard objects comprise: an account object, a lead object and an opportunity object, and wherein at least some of the custom objects extend functionality that standard objects provide.

5. The method of claim 4, further comprising:

creating a calendar item to be displayed within the user interface of the calendar application, wherein the calendar item comprises the instance of the object as data associated with the calendar item; and displaying the calendar item within the user interface of the calendar application.

6. A computing system comprising a processor and a memory, wherein the memory comprises computer-executable instructions that are configurable to cause the computing system to:

automatically detect a plurality of existing calendars that are displayed within a calendar context of a calendar application of a cloud computing platform that serves a plurality of different organizations, wherein the existing calendars are associated with a user of a particular organization of the plurality of different organizations, and wherein each calendar is related to at least one object type;

dynamically determine different object types that are associated with calendar items displayed in each of the existing calendars that were automatically detected as being associated with the user of the particular organization of the plurality of different organizations and specific to the particular organization, wherein the different object types comprise: standard objects that are defined by the cloud computing platform and that are common for each organization of the plurality of different organizations that utilize the cloud computing platform, wherein each standard object includes one or more pre-defined fields that are common for each organization that utilizes the cloud computing platform, and custom objects that are custom database tables defined by the particular organization and allow the particular organization to store information unique to their particular organization, wherein each custom object includes one or more custom fields defined by the particular organization for that custom object, wherein each instance of an object is storable as a record in a database system of the cloud computing platform;

provide a new object creation user interface (UI) element that includes a list of the different object types that can be created in a database system of the cloud computing platform and that are associated with the user of the particular organization of the plurality of different organizations, wherein the list of the different object types is dynamically defined for that user of that particular organization based on the calendar items displayed in each of the plurality of the existing calendars that were automatically detected as being associated with that user of that particular organization;

display, in response to selecting the new object creation UI element, the list of the different object types; and in response to selection of one of the different object types, create a record in the database system while remaining within a calendar context of the calendar application by presenting, in the calendar context, an object creation template for creation of the record; receiving user inputs via the object creation template; and saving the user inputs to the object creation template to create the record within the database system of the cloud computing platform while remaining in the calendar context and without leaving the calendar context.

7. The computing system of claim 6, wherein the object creation template comprises:
a window that appears overlying the calendar context, wherein the window comprises one or more elements that allow the user to input any information needed to create the record.

8. The computing system of claim 6, wherein the object creation template comprises:
a wizard UI feature that guides the user through a series of steps to create the record.

9. The computing system of claim 6, wherein the standard objects are customer relationship management (CRM) entities having a record type defined within the could computing platform, wherein the standard objects comprise: an account object, a lead object and an opportunity object, and wherein at least some of the custom objects extend functionality that standard objects provide.

10. The computing system of claim 9, wherein the computer-executable instructions are further configurable to cause the computing system to:
create a calendar item to be displayed within the calendar context, wherein the calendar item comprises the record as data associated with the calendar item; and
display the calendar item within the calendar context of the calendar application.

11. A calendar system, comprising:
a cloud computing platform configured to provide a calendar application for the cloud computing platform, wherein the cloud computing platform serves a plurality of different organizations, the cloud computing platform comprising: a database system configured to store objects, wherein the objects comprise: standard objects for the cloud computing platform that are common for each organization, and custom objects that are defined by a particular organization; and
a user system comprising a display configured to display a user interface of the calendar application that comprises calendar items associated with calendars generated by the calendar application, wherein the calendar application is configured to:
automatically detect existing calendars that are associated with a user of a particular organization of the plurality of different organizations, wherein each calendar is related to at least one object type;
dynamically determine different object types that are associated with calendar items displayed in each of the plurality of the existing calendars that were automatically detected as being associated with the user of the particular organization of the plurality of different organizations and specific to the particular organization, wherein the different object types comprise: standard objects that are defined by the cloud computing platform and that are common for each organization of the plurality of different organizations that utilize the cloud computing platform, wherein each standard object includes one or more pre-defined fields that are common for each organization that utilizes the cloud computing platform, and custom objects that are custom database tables defined by the particular organization and allow the particular organization to store information unique to their particular organization, wherein each custom object includes one or more custom fields defined by the particular organization for that custom object, wherein each instance of an object is storable as a record in a database system of the cloud computing platform;
display, in response to selecting a new object creation user interface (UI) element, a list of the different object types that can be created from within a context of the user interface of the calendar application, wherein the list of the different object types is dynamically defined for that user of that particular organization based on the calendar items displayed in each of the plurality of the existing calendars that were automatically detected as being associated with that user of that particular organization; and
create, from within the context of the user interface of the calendar application, an instance of a selected object type that is storable as record in the database system in response to selection of one of the different object types by presenting, in the calendar context, an object creation template for creation of the record; receiving user inputs via the object creation template; and saving the user inputs to the object creation template to create the record within the database system of the cloud computing platform while remaining in the calendar context and without leaving the calendar context.

12. The calendar system of claim 11, wherein the object creation template comprises:
a window that appears overlying the calendar context, wherein the window comprises one or more elements that allow the user to input any information needed to create the instance of the object.

13. The calendar system of claim 11, wherein the object creation template comprises:
a wizard UI feature that guides the user through a series of steps to create the instance of the object.

14. The calendar system of claim 11, wherein the standard objects are customer relationship management (CRM) entities having a record type defined within the could computing platform,
wherein the standard objects comprise: an account object, a lead object and an opportunity object, and wherein at least some of the custom objects extend functionality that standard objects provide.

15. The calendar system of claim 14, wherein the calendar application is further configured to:
create a calendar item to be displayed within the user interface of the calendar application, wherein the calendar item comprises the instance of the object as data associated with the calendar item; and
display the calendar item within the user interface of the calendar application.

* * * * *